United States Patent [19]

Morrey

[11] 4,124,466
[45] Nov. 7, 1978

[54] ENHANCING CHEMICAL REACTIONS

[75] Inventor: John R. Morrey, Richland, Wash.

[73] Assignee: Battelle Memorial Institute, Columbus, Ohio

[21] Appl. No.: 480,411

[22] Filed: Jun. 18, 1974

Related U.S. Application Data

[63] Continuation-in-part of Ser. No. 307,380, Nov. 17, 1972, abandoned.

[51] Int. Cl.$^2$ .............................................. B01J 1/10
[52] U.S. Cl. ........................... 204/157.1 R; 204/158 R
[58] Field of Search ..................... 204/157.1 R, 158 R, 204/162 R, DIG. 11

[56] References Cited

FOREIGN PATENT DOCUMENTS 1,284,620 8/1972 United Kingdom ............ 204/DIG. 11

OTHER PUBLICATIONS

Artamonova et al, Soviet Physics JETP, vol. 31 No. 6 (Dec. 1970) pp. 1185-1188.
Ambartzumian et al, Applied Optics, vol. 11, No. 2 (Feb. 1972) pp. 354-358.

*Primary Examiner*—Howard S. Williams
*Attorney, Agent, or Firm*—Philip M. Dunson; Joseph J. Hauth; David L. Prezbindowski

[57] ABSTRACT

Methods of enhancing selected chemical reactions. The population of a selected high vibrational energy state of a reactant molecule is increased substantially above its population at thermal equilibrium by directing onto the molecule a beam of radiant energy from a laser having a combination of frequency and intensity selected to pump the selected energy state, and the reaction is carried out with the temperature, pressure, and concentrations of reactants maintained at a combination of values selected to optimize the reaction in preference to thermal degradation by transforming the absorbed energy into translational motion. The reaction temperature is selected to optimize the reaction.

Typically a laser and a frequency doubler emit radiant energy at frequencies of $\nu$ and $2\nu$ into an optical dye within an optical cavity capable of being tuned to a wanted frequency $\delta$ or a parametric oscillator comprising a non-centrosymmetric crystal having two indices of refraction, to emit radiant energy at the frequencies of $\nu$, $2\nu$, and $\delta$ (and, with a parametric oscillator, also at $2\nu-\delta$). Each unwanted frequency is filtered out, and each desired frequency is focused to the desired radiation flux within a reaction chamber and is reflected repeatedly through the chamber while reactants are fed into the chamber and reaction products are removed therefrom.

4 Claims, 16 Drawing Figures

Figure 1 - Enhancement ratio for the reaction $2NH_3(g) \rightarrow N_2H_4(g) + H_2(g)$. The upper curve for a given symbol represents calculations with the collision efficiency $f_{AA}=10^{-3}$; the lower curve, $f_{AA} = 1$. Each curve represents an enhancement ratio for a laser flux as indicated. Steady state power was assumed.

Figure 2 – The calculated effect of several variables on the laser-enhanced reaction $2NH_3 \rightarrow N_2H_4 + H_2$. The upper curve for a given symbol represents calculations whre the collision efficiency was taken to be $10^{-3}$. The lower curve represents $f_{AA} = 1$.

Figure 3 - Expenditure of laser energy per mole of product as a result of laser excitation. Upper curves with the same symbol are calculated assuming collisional efficiencies $f_{AA} = 1$; lower curve, $f_{AA} = 10^{-3}$.

Figure 4 - Pulsed laser reaction enhancement of $2NH_3 \rightarrow N_2H_4 + H_2$. $P_o$ = 1 atm, T = 500°K, $k_4$ = 1 × $10^5$, t = 0.1, $\rho$ = $10^9$, $f_{AA}$ = $10^{-3}$, $\psi(0,5) \rightarrow \psi(2,7) \rightarrow \psi(4,9)$. Initial energy expenditure per mole = 1.9 × $10^7$ KWH/Mole.

Figure 5 — Same as figure 4 except $k_4 = 10^7 \text{ sec}^{-1}$.
Initial energy expenditure per mole of product = $1.3 \times 10^8$ KWH per mole of product.

Figure 6 - Same as figure 4 except $k_4 = 10^9$ sec$^{-1}$.
Initial energy expenditure per mole of product = $6.2 \times 10^{11}$ Figure 7 — Same as figure 5 except $\rho = 10^{12}$ watts/cm$^2$. Initial energy expenditure per mole of product = $3.5 \times 10^9$.

Figure 8 - Hypothetical Reaction $2A \rightarrow C + D$ where molecular parameters are the same as $NH_3$. $P_o = 1$ atm, $T = 500°K$, $k_4 = 10^7$, $\varepsilon = 0.1$, $\rho = 10^9$, $f_{AA} = 10^{-3}$ $\Delta G_f^{\ddagger} = 30$ Kcal/mole, $\Delta G_b^{\ddagger} = 10$ Kcal/mole. Initial energy expenditure = 3.0 KWH/mole.

Figure 9 - Expected energy expenditure for gaseous bimolecular reactions, T = 300°K Figure 10 - Same as Figure 9 except at 700°K Figure 11 – Energy Expenditure and Optimum Laser Intensity vs the Arrehenius Frequency Factor. Typical Molecular Constants Used: $F_A = 500$, $\bar{\nu}_i = 3500$ cm$^{-1}$, $B = 5$ cm$^{-1}$; $D_A = 3.5$Å, $F_{AA} = 10^{-3}$; $\mu = 28$; $\epsilon_i(\nu_i) = 10^3$, $k_4 = 10^7$, $\nu$'s = 500, 1000, 2000, 3000, 3500 with degeneracy 2, 3, 4, 4, 5, respectively. $T = 300°K$.

Figure 12 - Same as Figure 11 except T = 500°K.

Figure 13 - Same as Figure 11 except T = 700°K.

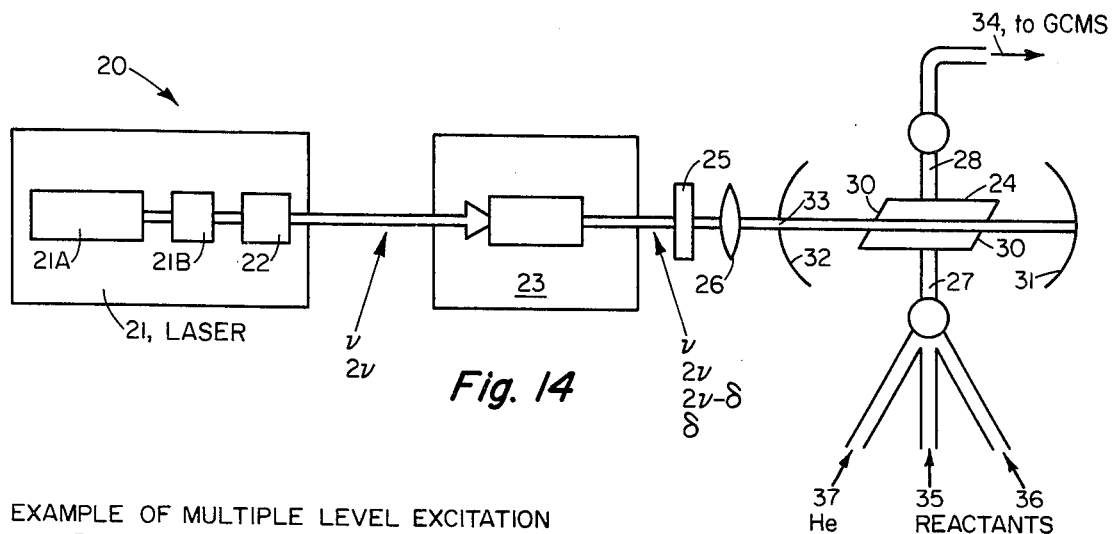
Fig. 14
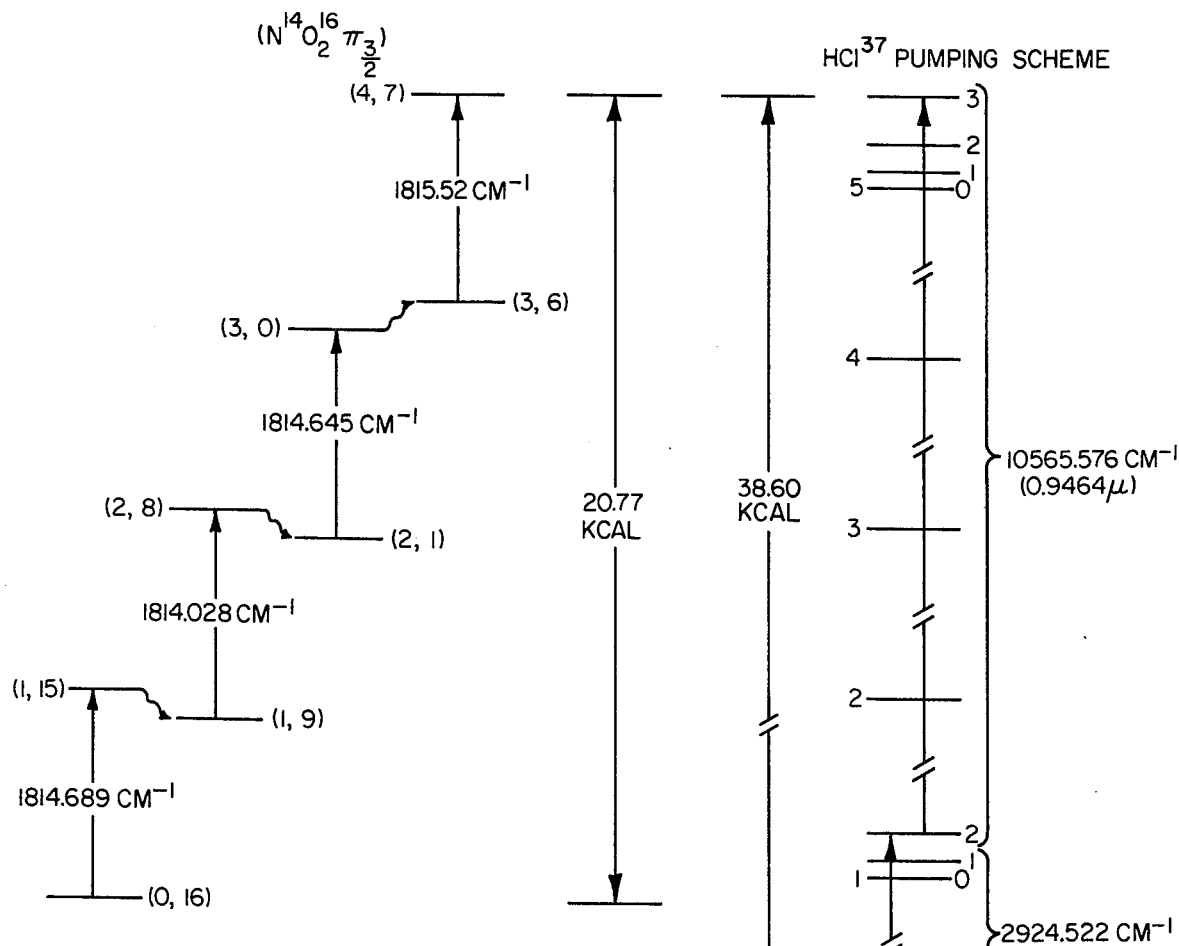
EXAMPLE OF MULTIPLE LEVEL EXCITATION
BY A SINGLE LASER FREQUENCY
Fig. 15
Fig. 16

ENHANCING CHEMICAL REACTIONS

CROSS REFERENCE TO RELATED APPLICATION

This application is a continuation in part of application Ser. No. 307,380, filed Nov. 17, 1972, now abandoned.

BACKGROUND OF THE INVENTION

The advent of powerful frequency-modulated infrared lasers brings into practical possibility the activation of chemical reactions by vibrational excitation. Because such reactions will involve systems with vibrational states out of thermal equilibrium, reactions may also be induced which are not normally observed. Furthermore, solid state reactions may be affected at cryogenic temperatures and equilibria may be displaced significantly by optical pumping. This paper examines the conditions necessary for infrared-laser-activated reactions. Appropriate experimental conditions are predicted.

One of the important applications of infrared lasers may well be the activation of highly selective chemical reactions and the study of their fundamental dynamics. Although initial success is likely to occur with gaseous reactions, liquid and solid reactions may follow. Isotopic separation may also be made highly selective by this technique.

Excitation by infrared lasers is fundamentally different than excitation by high energy lasers in the visible or u.v. range, the latter causing electronic transitions, usually with secondary energy transitions to the translational and vibrational degrees of freedom in a somewhat random fashion. Excitation by infrared places energy in the vibrational modes in a selective fashion, giving rise to the possibility of highly selective reactions.

We began to seriously consider the possibility of using infrared lasers for chemical activation over five years ago. However, at that time, the number of available infrared laser frequencies was severely limited and the techniques for modulation were not sufficiently advanced for our needs as we saw them then. Now a wide range of infrared laser frequencies can be generated and laser systems which can be tuned over wide frequency ranges are commercially available.

Practical modulation rates of these systems are still slow for this application, but it is conceivable that in the not-too-distant future frequency modulation over a wide range may be accomplished in nanosecond times. This will allow infrared cascading to be used to generate excited vibrational states resulting in larger populations than would be obtainable under thermal equilibrium conditions at thousands of degrees, under which conditions, of course, the simplest molecule would be torn apart.

Apparently the first experimental paper which describes laser infrared activation of a chemical reaction can be attributed to Bordé et al who used a $CO_2$ laser to excite and react $SF_6$, $C_2H_4$, $C_3H_6$, and $PH_3$.[1] Mayer et al[2] used a continuous-wave hydrogen fluoride laser to successfully separate deuterium from hydrogen by specific activation of the reaction of methanol with bromine. Russian workers at the Lebedev Physics Institute, also known to be working in the field, have reported laser induced reactions with $N_2F_4$, $BCl_3$, $SiH_4$, and $SF_6$ which proceed at explosive rates.[3]

We seriously considered the possibility of using infrared lasers for chemical activation in 1965. However, at that time, the number of available infrared laser frequencies was severely limited and the techniques for tuning were not sufficiently advanced for our needs as we saw them then, when we envisioned the need for a laser capable of being tuned over an appreciable range in a nanosecond. Now, in 1974, a wide range of infrared laser frequencies can be generated and laser systems which can be tuned over wide frequency ranges are commercially available. Practical modulation rates of these systems are still slow for this application, but it is expected that tuning over a wide enough frequency range may soon be accomplished in short enough times to minimize the effect of collisional process by cascading molecules into highly excited vibrational states in shorter than collision times. Such a capability will allow chemists and physicists to measure single vibrational and rotational relaxation processes definitively and to measure in detail the contribution of specific vibrational and rotational states to chemical reactions.

Infrared lasers already have been used in the study of vibrational relaxation times for some simple molecules.[8,39,40] They have been used in conjunction with molecular beam experiments to elucidate the importance of vibrational energy in chemical reactions.[41] Some preliminary experiments have also been reported which verify that infrared lasers can markedly enhance chemical reactions even when competing collisional processes are important.[1,2,42]

A number of recent papers report experiments and theory bearing on the general question of relaxation processes within the molecule, many of which must be considered as competitors to the actual reaction rate.[43] Both intramolecular and intermolecular processes are important in the prediction of laser reaction enhancement. Considerable emphasis has been given to simple molecules in this regard, but little has been reported on vibrational relaxation processes of heavier molecules in the ground electronic state. Until this information is available, the complete potential of laser-enhanced reactions in activating specific chemical bonds cannot be completely assessed. Selective reactions for simple molecules, on the other hand, caused by energy enrichment of specific vibrational modes will most certainly produce products not normally observed under thermally equilibrated conditions.

Our approach has been to develop a mathematical formulation which, when used along with molecular dynamic measurements, can predict the rate enhancement caused by appropriately tuned lasers. The development follows the method used in transition state theory. It does not incorporate either the adiabatic condition nor does its usage depend upon the thermal equilibrium approximation, although it is derived from consideration of conditions of thermal equilibrium.

All molecules have characteristic vibrational frequencies. Their bonding is partly covalent and partly ionic, and all reactions which result in formation of new products involve breaking of bonds through extension of the distance between atoms within the molecule. The extension is a function of the vibrational excitation of the molecule, so the principles and techniques of this invention are applicable to all molecules. When the spectroscopy is known, excitation schemes can be developed and reaction conditions can be specified for production of specific compounds.

Efficient and easily employed conditions typically involve multiple excitation of a given molecule using one laser frequency, on a time scale that is short by comparison with the average time between molecular collisions.

An important objective of our latest activity is to select and experimentally measure the laser-enhanced reaction of a simple system which can be used to determine the predictive accuracy of the previously developed theory. The simplest systems involve molecules with only one degree of vibrational freedom where intramolecular relaxations do not occur. Hence, reactions involving diatomics are attractive.

SUMMARY OF THE INVENTION

A typical method according to the present invention for enhancing a selected chemical reaction comprises increasing the population of a selected high vibrational energy state of a reactant molecule substantially above its population at thermal equilibrium by directing onto the molecule a beam of radiant energy from a laser having a combination of frequency and intensity selected to pump the selected energy state, and carrying out the reaction with the temperature, pressure, and concentrations of reactants maintained at a combination of values selected to optimize the reaction in preference to thermal degradation by transforming the absorbed energy into translational motion. The reaction temperature preferably is selected to optimize the reaction as determined by equation (44). (The equations and table referred to in this summary appear in the description of preferred embodiments.)

Photons are excited from one energy level either to the next higher energy level or to a level above the next higher energy level. In the latter case, radiant energy is provided having a plurality of selected frequencies, either by a plurality of lasers or by a laser tuned rapidly from one selected frequency to another, typically from higher to lower frequencies corresponding to the vibrational energy levels of the molecule being excited, to successively populate higher vibrational levels of the molecule. The laser should be tuned at a rate comparable to those of the dynamic processes within the molecule leading to depopulation.

The laser intensity preferably is selected to provide substantially the minimum expenditure of energy per mole of product. Where the reaction is bimolecular, being representable as $2A \rightarrow B + C$, the laser intensity $I_{opt}$ preferably is substantially the value determined by equation (45), and the concentration of the reactant $[A_{in}]$ is substantially as determined by equation (16). Where the reaction is unimolecular, being representable as $A \rightarrow B$, the laser intensity $I_{opt}$ preferably is substantially the value determined by equation (45) where $C_4$ has substantially the value determined by equation (47). Where the reaction is unimolecular, being representable as $A \rightarrow B$, the Arrehenius frequency factor is about $10^{12}$ to $10^{15}$, and the temperature during the reaction is about 300 to 700° K, the laser intensity $I_{opt}$ preferably has substantially the value obtained or interpolated from the applicable curve or curves in FIGS. 11, 12, or 13 of the drawings.

In a typical method for enhancing a bimolecular reaction, the reaction is driven beyond the equilibrium point by the factor $\phi_{AB}$ in accordance with equation (9g).

Where the method is used for enhancing a bimolecular reaction listed in Table III, it is preferred that $E_{act}$, A, $k_{2fe}$, $\Delta S_p^{\ddagger}$, $\Delta H^{\ddagger}$, $k_{2fe}\phi_{AB}$, and $E_x$ have approximately the respective values listed in Table III, or interpolated therefrom, for the reaction pressure and temperature.

If rotational equilibrium is rapidly attained, S in equation (9c') does not include the rotational energy levels. This increases the magnitude of $\xi$, and thus the enhancement of the reaction.

In a typical method according to this invention, a laser and a frequency doubler emit radiant energy at frequencies of $\nu$ and $2\nu$ into an optical dye within an optical cavity capable of being tuned to a wanted frequency $\delta$ or a parametric oscillator comprising a noncentrosymmetric crystal having two indices of refraction to emit radiant energy at the frequencies of $\nu$, $2\nu$, and $\delta$ (and, with a parametric oscillator, also a $2\nu - \delta$). These frequencies are adjusted to desired values by selection of the lasing materials, by tuning of the optical cavities, and by controlling the temperature of the parametric oscillator. Typically each unwanted frequency is filtered out, and each desired frequency is focused to the desired radiation flux within a reaction chamber and is reflected repeatedly through the chamber while reactants are fed into the chamber and reaction products are removed therefrom.

In a typical method for enhancing the reaction of HCl with NO to yield the HNO dimer, a neodymium doped yttria garnet laser provides radiant energy at a frequency of about 10565 cm$^{-1}$, the radiation frequency is doubled to about 21130 cm$^{-1}$, the doubled frequency radiant energy is passed through a crystal of lithium niobate at a temperature of about 350° C and oriented to emit radiant energy at frequencies of about 2924 cm$^{-1}$ and 18206 cm$^{-1}$, and the radiant energy at about 10565 cm$^{-1}$ and 2924 cm$^{-1}$ is directed to the reactants.

In another typical method NO is excited to the 5th vibrational state by radiant energy at a frequency of about 1814.6 cm$^{-1}$ as illustrated in FIG. 15.

BRIEF DESCRIPTION OF THE DRAWINGS

FIG. 1 — Enhancement ratio for the reaction $2NH_3(g) \rightarrow H_2(g)$. The upper curve for a given symbol represents calculations with the collision efficiency $f_{AA} = 10^{-3}$; the lower curve, $f_{AA} = 1$. Each curve represents an enhancement ratio for a laser flux as indicated. Steady state power was assumed.

FIG. 2 — The calculated effect of several variables on the laser-enhanced reaction $2NH_3 \rightarrow N_2H_4 + H_2$. The upper curve for a given symbol represents calculations where the collision efficiency was taken to be $10^{-3}$. The lower curve represents $f_{AA} = 1$.

FIG. 3 — Expenditure of laser energy per mole of product as a result of laser excitation. Upper curves with the same symbol are calculated assuming collisional efficiencies $f_{AA} = 1$; lower curve, $f_{AA} = 10^{-3}$.

FIG. 4 — Pulsed laser reaction enhancement of $2NH_3 \rightarrow N_2H_4 + H_2$. $P_o = 1$ atm, T = 500° K, $k_4 = 1 \times 10^5$, $t = 0.1$, $\rho = 10^9$, $f_{AA} = 10^{-3}$, $\Psi(0,5) \rightarrow \Psi(2,7) \rightarrow \Psi(4,9)$. Initial energy expenditure per mole = $1.9 \times 10^7$ KWH/Mole.

FIG. 5 — Same as FIG. 4 except $k_4 = 10^7$ sec$^{-1}$. Initial energy expenditure per mole of product = $1.3 \times 10^8$ KWH per mole of product.

FIG. 6 — Same as FIG. 4 except $k_4 = 10^9$ sec$^{-1}$. Initial energy expenditure per mole of product = $6.2 \times 10^{11}$ FIG. 7 — Same as FIG. 5 except $\rho = 10^{12}$ watts/cm$^2$. Initial energy expenditure per mole of product = $3.5 \times 10^9$.

FIG. 8 — Hypothetical Reaction 2A → C + D where molecular parameters are the same as $NH_3$. $P_o$ = 1 atm, T = 500° K, $k_4 = 10^7$, $\epsilon = 0.1$, $\rho = 10^9$, $f_{AA} = 10^{-3}$, $\Delta G_f^{\ddagger} = 30$ Kcal/mole, $\Delta G_b^{\ddagger} = 10$ Kcal/mole. Initial energy expenditure = 3.0 KWH/mole.

FIG. 9 — Expected energy expenditure for gaseous bimolecular reactions, T = 300° K FIG. 10 — Same as FIG. 9 except at 700° K FIG. 11 — Energy Expenditure and Optimum Laser Intensity vs the Arrehenius Frequency Factor. Typical Molecular Constants Used: $F_A = 500$, $\bar{v}_i = 3500$ cm$^{-1}$, $B = 5$ cm$^{-1}$; $D_A = 3.5$A, $F_{AA} = 10^{-3}$; $\mu$ 28; $\epsilon i(v_i) = 10^3$, $k_4 = 10^7$, $v$'s = 500, 1000, 2000, 3000, 3500 with degeneracy 2, 3, 4, 4, 5, respectively. T = 300° K.

FIG. 12 — Same as FIG. 11 except $T = 500°$ K.

FIG. 13 — Same as FIG. 11 except $T = 700°$ K.

FIG. 14 is a schematic view of typical apparatus for use in practicing the present invention.

FIG. 15 is an energy diagram illustrating an example of multiple level excitation by a single laser frequency in accordance with this invention.

FIG. 16 is an energy diagram illustrating an example of excitation by a pair of selected radiation frequencies.

DESCRIPTION OF PREFERRED EMBODIMENTS

Figure 1:
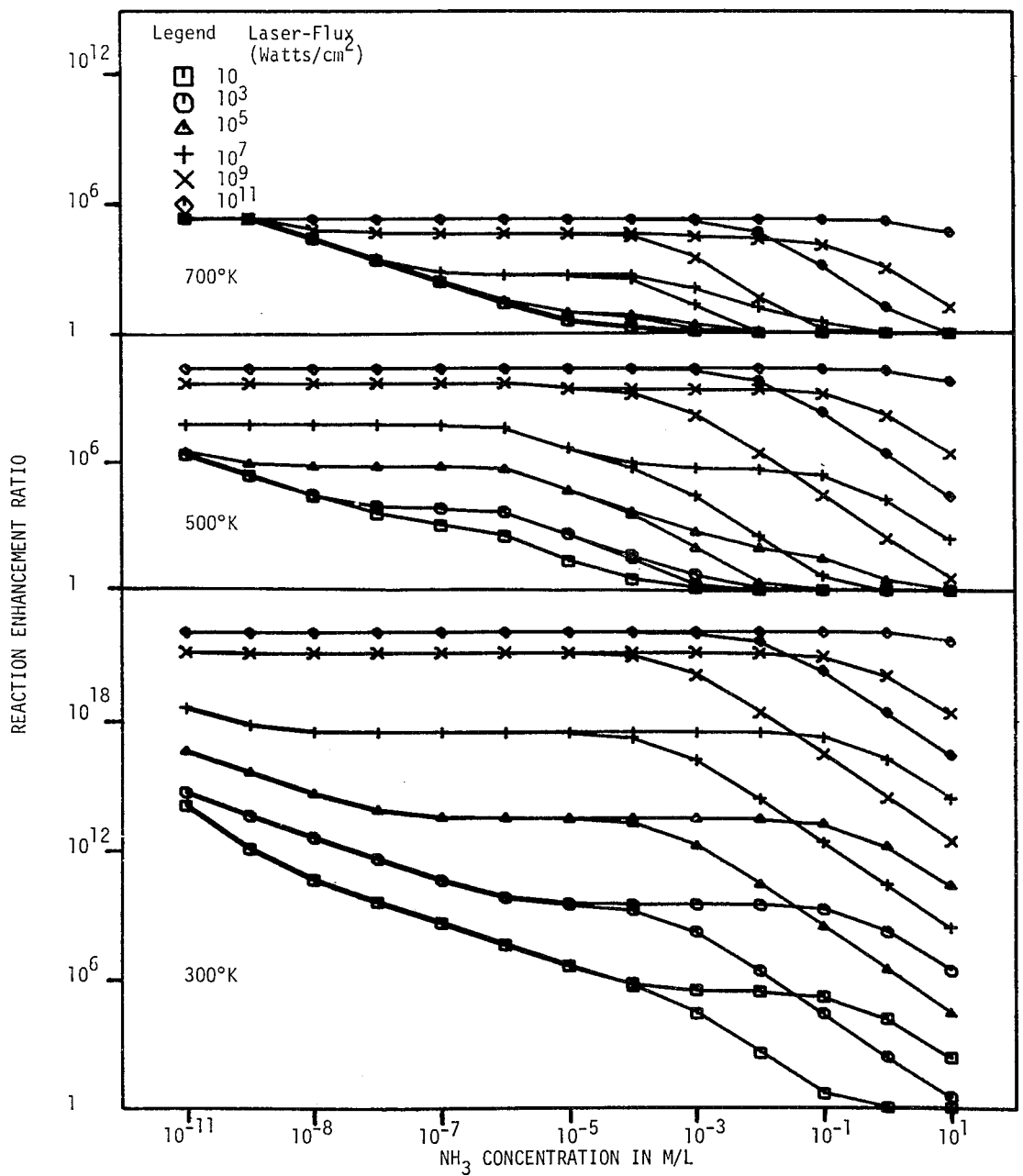
FIGS. 1-13 are graphs illustrating various features of the present invention as follows.

Consider for illustrative purposes a simple bimolecular reaction A+B→C+D where the reaction rate is conventionally expressed as $$\frac{d[C_t]_e}{dt} = k_{2fe}[A_t][B_t] - k_{2be}[C_t][D_t] \tag{1}$$

where $[X_t]$ represents the total concentration of component X, including populations in all of its energy states. The subscript e, designates thermal equilibrium. According to the well known absolute rate theory [3] the reaction rate of equation (1) can be written as $$\frac{d[C_t]_e}{dt} = \frac{\kappa kT}{h}[C_t^{\ddagger}]_e - k_{2be}[C_t][D_t] = \frac{d[C_t]_{fe}}{dt} - \frac{d[C_t]_{be}}{dt} \tag{2}$$

where $[C_t^{\ddagger}]$ represents the concentration of the activated complex and $\kappa kT/h$ is the frequency of passing over the activation barrier along the reaction coordinate. Combining equations (1) and (2) gives the result $$k_{2fe} = \frac{\kappa kT}{h} \frac{[C_t^{\ddagger}]_e}{[A_t][B_t]} = \frac{\kappa kT}{h} K_c^{\ddagger} = \frac{\kappa kT}{h} \cdot K_p^{\ddagger} \cdot \bar{V}$$

where $\bar{V}$ is the molar volume.

Since $$K_p^{\ddagger} = \frac{F_C^{\ddagger}}{F_A F_B} e^{\frac{-\epsilon_{of}}{kT}},$$

where $F_X$ is the gaseous molecular partition function divided by Avogadro's number, we obtain $$k_{2fe} = \frac{\kappa kT}{h} \cdot \bar{V} \cdot \frac{F_C^{\ddagger}}{F_A F_B} e^{\frac{-\epsilon_{of}}{kT}}. \tag{3a}$$

Since for perfect gases $F_X$ can be written $F_X'\bar{V}$, where $\bar{V}$ is to be found in the translational partition function, it follows that $$k_{2fe} = \frac{\kappa kT}{h} \frac{F_C^{\ddagger'}}{F_A' F_B'} e^{\frac{-\epsilon_{of}}{kT}}. \tag{4}$$

Likewise, $$k_{2be} = \frac{\kappa kT}{h} \frac{F_C^{\ddagger'}}{F_C' F_D'} e^{\frac{-\epsilon_{ob}}{kT}}. \tag{4a}$$

Because $$[X_t] = \Sigma[X_i] \text{ and } [X_{ie}] = \frac{g_{iX}}{g_{oX}}[X_o]e^{\frac{-\epsilon_{iX}}{kT}}, \tag{4b}$$

where $g_{iX}$ designates the multiplicity of state $i$ of molecule X, we can also write $$[X_{ie}] = \frac{g_{iX}[X_t]}{F_X} e^{\frac{-\epsilon_{iX}}{kT}} \tag{5}$$

which will be useful in later derivations.

Equation (4) takes into account the contribution of all energy states to the forward reaction only if the system is in thermal equilibrium. Of course, high-intensity laser pumping of vibrational states will dramatically disturb the equilibrium between resonant states, rendering equation (4) inappropriate.

To formulate a non-equilibrium expression we shall consider all energy states of components A and B as competing reactants, i.e., $$\frac{d[C_t]_n}{dt} = \sum_{ijk} k_{ijk}[A_j][B_j] - k_{2be}[C_t][D_t] \tag{6}$$

$$= \sum_{ijk} \frac{\kappa_{ijk}kT}{h}[C_k^{\ddagger}] - k_{2be}[C_t][D_t]. \tag{7}$$

Using the principle of detailed balancing of equation (7), we can write $$k_{ijk} = \frac{\kappa_{ijk}kT}{h} \frac{[C_k^{\ddagger}]}{[A_i][B_j]} = \frac{\kappa_{ijk}kT F_{kC}^{\ddagger}}{h F_{iA}F_{jB}} e^{\frac{-(\epsilon_{kC}-\epsilon_{jB}-\epsilon_{iA})}{kT}} e^{\frac{-\epsilon_{of}}{kT}}, \tag{8}$$

where $F_{i\alpha} = g_{i\alpha}/V$. When $\epsilon_{of} < \epsilon_{jB}+\epsilon_{iA}$, $k_{ijk}$ no longer increases exponentially with energy of the excited levels, a fact which must be reflected in (8). We thus write $$k_{ijk} = \frac{\kappa_{ijk}kT F_{kC}^{\ddagger}}{h F_{iA}F_{jB}} e^{\frac{-\epsilon_{kC}}{kT}} \text{MIN}\left[e^{\frac{-(\epsilon_{of}-\epsilon_{jB}-\epsilon_{iA})}{kT}}, 1\right] \tag{8a}$$

where MIN($\alpha,\beta$) indicates the lesser of $\alpha$ or $\beta$. This equation assumes equilibrium between species $A_i$, $B_j$ and $C_k$ but not necessarily total equilibrium between all states. Thus it will be applicable, at least to a resonable approximation, to a laser-activated system.

If we further assume $k_{ijk}$ to be constant, i.e., $\kappa' = \kappa_{ijk}$, and take into account that the high limit of reaction rate is determined by collisional frequency, we can write $$\frac{d[C_l]_n}{dt} = \frac{\kappa'kT\bar{V}e^{-\frac{\epsilon_{of}}{kT}}}{h} \sum_{ijk}^{\infty} \frac{[A_{in}][B_{jn}]}{g_{jB}\, g_{iA}} e^{\frac{\epsilon_{iA}+\epsilon_{jB}}{kT}} g_{kC}^{\pm} e^{\frac{\epsilon_{kC}}{kT}} \cdot \tag{9}$$

$$\text{MIN}\left[1, e^{\frac{\epsilon'_{of}-\epsilon_{iA}-\epsilon_{jB}}{kT}}\right] - k_{2be}[C_l][D_l]$$

where $\epsilon'_{of} = \epsilon_{of} + kT\ln[\text{MIN}(1,\gamma_{ijk})]$. The constant $\gamma_{ijk}$ is related to the collisional rate constant $k_{3AB}/f_{AB}$, i.e., $$\gamma_{ijk} = \frac{k_{3AB}hg_{iA}g_{jB}e^{\frac{\epsilon_{kC}}{kT}}}{\kappa'kT\bar{V}g_{kC}^{\pm}f_{AB}}, \text{ which, except} \tag{9a}$$

for rare exceptions, is greater than unity for all values of $i,j,k$.

Using equation (3a) we can rewrite (9):

$$\frac{d[C_l]_n}{dt} = k_{2fe}[A_l][B_l]\phi_{AB} - k_{2be}[C_l][D_l] \tag{9b}$$

where $$\phi_{AB} = \frac{\kappa'F_AF_B}{\kappa[A_l][B_l]F_C^{\pm}} \left\{ \sum_{ijk}^{\infty} \frac{[A_i][B_j]}{g_{iA}g_{jB}} \exp[(\epsilon_{iA}+\epsilon_{jB})/kT] g_{kC}^{\pm} \right. \tag{9c}$$

$$\left. \exp\left(-\frac{\epsilon_{kC}}{kT}\right) \text{MIN}\left[1, \exp(\epsilon'_{of}-\epsilon_{iA}-\epsilon_{jB})/kT\right] \right\}$$

Evaluation of $\kappa'$

The constant $\kappa'$ can be evaluated under conditions of complete equilibrium when equation (5) can be used and $\phi_{AB} = 1$:

$$\kappa' = \frac{\kappa F_C^{\pm}}{\sum_{ijk}^{\infty} g_{kC}^{\pm} e^{-\frac{\epsilon_{kC}}{kT}} \text{MIN}[1, \exp\{(\epsilon'_{of}-\epsilon_{iA}-\epsilon_{jB})/kT\}]}$$

When $\gamma_{ijk} > 1$, $\kappa'$ can be written as $\kappa' = \kappa/S$ where $$S = \sum_{i=o}^{\sigma_A(\epsilon_{of})} [\sigma_B(\epsilon_{of}-\epsilon_{iA}) + \Omega_B(\epsilon_{of}-\epsilon_{iA})] + \tag{9c'}$$

$$\sum_{i=\sigma_A(\epsilon_{of})}^{\infty} \Omega_B(o) \text{ and}$$

$$\Omega_B(\epsilon) = \sum_{\epsilon_{jB}=\epsilon}^{\infty} \exp(-(\epsilon_{jB}+\epsilon_{iA}-\epsilon'_{of})/kT) \tag{9d}$$

The term $\Omega_B(\epsilon'_{of} - \epsilon_{iA})$ is largest when $\epsilon_{iA} = \epsilon'_{of}$ and under these conditions, $$\Omega_B(0) = \sum_{\epsilon_{jB}=o}^{\infty} e^{-\frac{\epsilon_{jB}}{kT}} < F_B.$$

Thus $\Omega_B$ can be ignored for all cases except when there is a laser-excited level equal to or greater than $\epsilon_{of}$. To this approximation then $$S = \sum_{i=o}^{\sigma_A(\epsilon_{of})} \sigma_B(\epsilon_{of} - \epsilon_{iA}).$$

Thus we can rewrite $\phi_{AB}$ as $$\phi_{AB} = \frac{F_AF_B}{[A_l][B_l]S} \sum_{ij} \ldots = \xi \sum_{ij} \ldots$$

For non-thermally equilibrated systems we can express $\phi_{AB}$ as $$\phi_{AB} = \xi \left[\sum_{i}^{e} + \sum_{i}^{n_i}\right]\left[\sum_{j}^{e} + \sum_{j}^{n_j}\right] \tag{9f}$$

where $e$ refers to summation over equilibrated states and $n$, non-equilibrated states. It is easy to show that $\xi$ $$\sum_{i}^{e} \sum_{j}^{e}$$

approaches unity to a high degree of approximation if $n_i$ and $n_j$ are small compared to the total number of levels available in the system. For any experiment with a finite number of fixed-frequency lasers, this approximation will be quite precise. Thus we can express (9f) as a summation of four terms:

$$\phi_{AB} = 1 + \phi_{ne} + \phi_{en} + \phi_{nn}. \tag{9g}$$

The second term can be written $$\phi_{ne} = \tag{9h}$$

$$\frac{F_A}{[A_l]S}\left\{\sum_{i=o}^{n_A} \frac{[A_{in}]}{g_{iA}} e^{\frac{\epsilon_{iA}}{kT}} \sum_{j=o}^{\infty} \text{MIN}\left(1, e^{\frac{\epsilon'_{of}-\epsilon_{iA}-\epsilon_{jB}}{kT}}\right)\right\}$$

where $\sigma_i(\epsilon)$ is the number of energy levels of molecule $i$ between 0 and $\epsilon$, $\beta$ is the symmetry factor and $n_i$ is the total number of levels displaced from thermal equilibrium. When A and B are the same molecule, $\beta = 2$; otherwise $\beta = 1$. If no levels above $\epsilon'_{of}$ are displaced from thermal equilibrium, the second $\Sigma$ term vanishes. Expanding eqn (9h) and using eqn (9d), we obtain $$\phi_{ne} = \frac{F_A}{\beta S[A_l]}\left\{\sum_{i=o}^{\sigma_A(\epsilon_{of})} e^{\frac{\epsilon_{iA}}{kT}} \frac{[A_{in}]}{g_{iA}} [\sigma_B(\epsilon'_{of}-\epsilon_{iA}) + \right. \tag{9j}$$

$$\left. \Omega_B(\epsilon'_{of}-\epsilon_{iA})] + \sum_{i=\sigma_A(\epsilon_{of})}^{n_A} \frac{[A_{in}]}{g_{iA}} e^{\frac{\epsilon_{iA}}{kT}} \Omega_B(0)\right\}.$$

The term $\Omega_B(\epsilon'_{of} - \epsilon_{iA})$ is largest when $\epsilon_{iA} = \epsilon'_{of}$ and under these conditions, $$\Omega_B(0) = \sum_{\epsilon_{jB}=o}^{\infty} e^{-\frac{\epsilon_{jB}}{kT}} < F_B.$$

Unless one of the laser-excited levels is equal to or greater than $\epsilon'_{of}$, $\Omega_B$ can be ignored.

The third term, $\phi_{en}$, is obtained by interchanging B and $j$ with A and $i$ in equation (9j).

The fourth term is expressed by $$\phi_{nn} = \frac{F_A F_B}{S[A_t][B_t]} \sum_{i=o}^{n_A} \sum_{j=p}^{n_B} \frac{[A_{in}][B_{jn}]}{g_{iA} g_{jB}} e^{-\frac{\epsilon_{iA} + \epsilon_{jB}}{kT}} \text{MIN}\left[1, e^{\frac{\epsilon_{of} - \epsilon_{iA} - \epsilon_{jB}}{kT}}\right] \quad (10)$$

where $p > i$ if A = B and $p = o$ if A ≠ B.

It is important at this point to remark that if A and B do not represent the same entity then one must contend with reactions of the type $$A + A \xrightarrow{k_A} E + F$$

as well as $$A + B \xrightarrow{k_{2fe}} C + D.$$

Unless $k_A << k_{2fe}$, the first reaction will also be enhanced.

To obtain $\sigma_{60}(\epsilon)$ we consider the vibrational and rotational levels in particular. Although the translational levels are large they will be ignored because thermal equilibrium of translational levels are large they will be ignored because thermal equilibrium of translational levels is not disturbed. Let $nv_k$ be the number of vibrational levels of vibrator $k$ between 0 and $\epsilon'_{of}$. The quantum mechanical relations for the rotational level $j$ associated with the vibrational state $ik$ is given by $$J_{jik}(J_{jik} + 1) = \epsilon_{jik}/B. \quad (11)$$

where $B$ is the rotational constant.

The number of levels associated with the $i^{th}$ level of the $k^{th}$ vibrator therefore becomes $$N_{Tik} = 0.5 \left(\sqrt{1 + \frac{4}{B}(\epsilon_o - ihv_k)} - 1\right) \quad (12)$$

The number of levels associated with the $k^{th}$ vibrator is $$N_{Tk} = \sum_{i=o}^{n_k} N_{Tik} \text{ where } n_k = \epsilon_o/hv_k \quad (13)$$

The total number of levels becomes $$\sigma_a(\epsilon) = \sum_{k=o}^{n_\nu} g_k N_{Tk} \quad (14)$$

where $n$ is the number of fundamental frequencies of degeneracy $g_k$.

It is obvious from equation (9c) that the overall reaction rate can be enhanced tremendously, provided upper states [$A_i$] and [$B_j$] can be significantly populate above thermal equilibrium, because each concentration term is multiplied by an exponential energy term. Several lasers tuned to $$\nu_i = \frac{\epsilon_i}{h}$$

and $$\nu_j = \frac{\epsilon_j}{h}$$

could simultaneously populate $A_i$ and $B_j$ levels. For selective reactions involving isotope separation, however, it is only advantageous to activate the isotope-containing reactant.

It is now possible to define in quantitative terms an enhancement ratio $E_r$ as the ratio of equation (9b) combined with equation (1), to (2), i.e., $$E_r = \frac{\frac{d[C_t]_{ef}}{dt} \phi_{AB} - \frac{d[C_t]_{eb}}{dt}}{\frac{d[C_t]_{ef}}{dt} - \frac{d[C_t]_{eb}}{dt}} \quad (15)$$

If the reaction is negligible $E_r = \phi_{AB}$. If all levels are at thermal equilibrium $E_r$ is unity.

Consider now the pumping of a vibrational mode of A by a laser tuned to the appropriate frequency $\nu_i$. There are a number of rate processes which must be considered:

| | |
|---|---|
| $A_{i-1} + h\nu_i \xrightarrow{B_{i-1,i}} A_i$ | induced adsorption increasing energy in one degree of freedom) |
| $A_i + B_t \xrightarrow{k_{2A_iB}} C + D$ | (reaction by the pumped molecule) |
| $A_t + B_t \xrightarrow{k_{2ef}} C + D$ | (reaction by equilibrated molecules) |
| $A_i + M_\alpha \xrightarrow{k_{3A\alpha}} A + M_\alpha^*$ | (degradation to thermal energy by collision-$M_\alpha$ represents all molecules, including A and B) |
| $A_i + h\nu_i \xrightarrow{B_{i,i-1}} A_{i-1} + 2h\nu_i$ | (induced emission) |
| $A_i \xrightarrow{k_{4i}} A_p^*$ | (internal energy redistributed by interaction at a distance) |
| $A_i \xrightarrow{A_{i,i-1}} A_{i-1} + h\nu_1$ | (spontaneous emission) |
| $A_t \xrightarrow{k_{5i}} A_i$ | (collisional population of state i). |

Determination of $\phi_{AB}$ and $A_{in}$ Under Steady State Approximation i-1,i i,i-1 i-1,i i,i-1

If A is excited by a continuous laser, it is appropriate to use the steady state approximation which, upon taking the above processes into consideration, gives rise to $$[A_{in}] = \quad (16)$$
$$\{B_{i-1,i}[A_{i-1n}]\rho(\nu_i) + K_{5i}[A_t]\}/\{k_{2A_iB}[B_t] + \sum_\alpha k_{3A\alpha}[M_\alpha] + B_{i-1,i}\rho(\nu_i) + A_{i,i-1} + k_{4i}\}$$

where $\rho(\nu_i) = I(\nu_i)/c\delta\nu$, $I(\nu_i)$ being the energy flux of laser radiation at frequency $\nu_i$; $B_{i-1,i} = B_{i,i-1}$ is Einstein's coefficient of induced absorption; $A_{i-1,i}$ is Einstein's coefficient of spontaneous emission which is related to $B_{i,i-1}$ by the relation $$A_{i,i-1} = \left(\frac{8\pi h \nu_i^3}{c^3}\right) B_{i,i-1} = 1.664 \times 10^{-25} \bar{\nu}_i^3 B_{i,i-1}. \quad (16a)$$

$B_{i,i-1}$ is given by $$B_{i,i-1} = (2\pi/3h^2) \sum_{q=1}^{3} \left|\langle \psi_i^0 | M_q | \psi_{i-1}^0 \rangle\right|^2 \quad (16b)$$

where $M_q$ is the dipole operator and $\bar{\nu}_i$ is a frequency expressed in wavenumbers.

The constants $k_{3A\alpha}$ are second order rate constants for the transfer of vibrational to translational energy upon collision of the laser-excited molecule with the $\alpha^{th}$ molecular species of the molecular mixture. They can be expressed as $$k_{3A\alpha} = \frac{9.733 \times 10^8 f_{A\alpha}(D_A + D_\alpha)^2}{\beta_{A\alpha}} \sqrt{\frac{T}{\mu_{A\alpha}}} \quad (16c)$$

where $f_{A\alpha}$ = fraction of collisions with $\alpha$ which cause deactivation of A $D_i$ = diameter of the $i^{th}$ species molecule in Angstroms $\beta_{A\alpha}$ = collision symmetry factor (2 for $A=\alpha$ collisions, 1 for $A \neq \alpha$ collisions)

$\mu_{A\alpha}$ = reduced mass of the collision entity in gms/mole.

The term $k_{2A_iB}[B_i]$ can be obtained from the following considerations.

$$k_{2A_iB}[A_{in}][B_i] = \sum_k \sum_j k_{ijk}[A_{in}][B_j] \quad (16d)$$

where $k_{ijk}$ is expressed in equation (8a). Thus $$k_{2A_iB}[B_i] = \quad (16e)$$

$$\frac{\kappa' kTV}{hg_{iA}} \sum_k \sum_j \frac{g_k C^{\ddagger}}{g_{jB}} [B_j] e^{-\frac{\epsilon_k C^{\ddagger}}{kT}} \text{MIN}(1, e^{-\frac{\epsilon'_{of} - \epsilon_{iA} - \epsilon_{jB}}{kT}})$$

which results in $$k_{2A_iB} = \frac{k_2 f_e F_A e^{\frac{\epsilon_{iA}}{kT}}}{5g_{iA}} \left[\sigma_B(\epsilon) + \Omega_B(\epsilon) + \right. \quad (16f)$$

$$\left. \frac{F_B}{[B_i]} \left\{\sum_{j=0}^{\sigma_B(\epsilon)} \frac{B_{jn}]}{g_{jB}} e^{\frac{\epsilon_{jB}}{kT}} + \sum_{j=\sigma_B(\epsilon)}^{n_{jB}} \frac{[B_{jn}]}{g_{jB}} e^{-\frac{\epsilon_{iA}}{kT}}\right\}\right]$$

where $\epsilon = \epsilon'_{of} - \epsilon_{ia}$ by the same arguments used above.

To a good approximation $k_{5i}$ can be obtained through consideration of the collisional process under equilibrium conditions, i.e. when $\rho(\nu_j) \sim 0$, and $A_{i, i-1}$ is neglected $$\left\{k_{2A_iB}[B_i] + \sum_\alpha k_{3A\alpha}[M_\alpha] + k_{4i}\right\}[A_{ie}] = k_{5i}[A_i]. \quad (17)$$

Hence $$k_{5i} \cong \left\{k_{2A_iB}[B_i] + \sum_\alpha k_{3A\alpha}[M_\alpha] + k_{4i}\right\} g_{iA} \exp - \{\epsilon_{iA}/kT\}/F_A \quad (18)$$

which is negligible for most cases.

The constant $k_{4i}$ is the most uncertain of the parameters in eqn (16). How it varies with the vibrational level $i$ is an interest currently being investigated.[5-8] The explanation of unimolecular reactions is closely tied to this question. The early formulations of unimolecular rate theory by Rice, Ramsberger and Kassell assumed a molecular model of coupled oscillators, giving rise to fast intramolecular redistribution of energy i.e., $k_{4i} \gtrsim 10^{12} \text{sec}^{-1}$. Slater challenged this assumption and proposed that the internal degrees of freedom should be treated as a set of $m$ orthogonal oscillators whose coupling would be hindered largely by selection rules. Hence, for his model $k_{4i}$ would be small.[9]

The major theoretical and experimental efforts have dealt with the decay from excited vibrational states within an electronically excited state and there seems to be mounting evidence that the vibrational relaxation rate within the excited electronic state is less than $10^{-11}$ sec except for some isolated molecules, $SF_6$[10] being an example. Those molecules whose vibronic absorption spectra indicate discrete vibrational modes are likely to be in the catogory with $SF_6$.

Dynamics of vibrational relaxation in molecules in the ground electronic state appear in general to be slower. Moore[11] describes laser-monitored experiments where the intramolecular vibrational transitions are slow enough to be collision-dependent.

From these measurements we can establish upper bounds for the constant $k_{4i}$. For example:

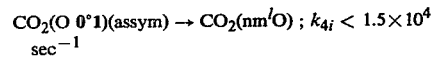

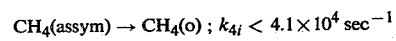

Lifetimes are not available for decay from single levels $i > 1$.

However to a crude approximation it appears that we can write $$k_{4i} \cong k_{3A\alpha}[M_\alpha] \sum_{i,j \neq i} f_{ij} e^{-\frac{[E_j - E_i]}{RT}}$$

where $f_{ij}$ is unity if the $i^{th}$ and $j^{th}$ vibrational levels belong to the same irreducible representation; otherwise, $f_{ij}$ ~0.1. As the energy of the $i^{th}$ vibrator increases, more summation terms become important because the density of states close to the state $i$ increases. It is obvious that rotational levels close to $E_i$ will equilibrate much faster than will vibrational levels but this will be of minor consequence in the enhancement of vibrationally excited molecules. When the density of states around $E_i$ becomes large, $k_{4i}$ can become larger than $k_{3A\alpha}[M_{60}]$.

The mass balance equation $$[A_{oe}] - [A_{on}] = \sum_{i=1}^{n_A} \{[A_{in}] - [A_{ie}]\} \quad (19)$$

where $n_A$ is the number of levels out of equilibrium, can be used with eqn (16) to obtain values of $[A_{in}]$.

The constant $B_{i-1,i}$ can be expressed in terms of the traditional molar absorptivity in l/mole cm according to the expression derived by considering an element of volume of unit area in cm² with a length of $\Delta x$ cm. The light absorption in this element is given by $$I(x) - I(x + \Delta x) = \qquad (20)$$

$$Nh\nu \cdot 10^{-3} \left[ B_{i-1,i}([A_{i-1}] - [A_i]\frac{I(\nu)}{c\,\delta\nu}) - A_{i,i-1}[A_i] \right]\Delta x$$

and since $$[A_i] = \frac{g_{iA}}{g_{i-1A}} e^{-\frac{\epsilon_{iA} - \epsilon_{i-1A}}{kT}} [A_{i-1}]$$

is negligible under equilibrium conditions for large energy differences, as is $A_{i,i-1}[A_i]$. We can write where $$a = \frac{Nh\nu \times 10^{-3}[A_{i-1}]B_{i-1,i}}{c\,\delta\nu} \quad \frac{-dI}{I} = a$$

Integrating, we obtain $$\log_{10}\left(\frac{I_o}{I}\right) = \frac{aL}{2.303}$$

where L is the length of the cell. According to the Beer-Lambert law, $$\frac{aL}{2.303} = \epsilon_{i-1,i}(\nu_i)\,[A_{i-1}]L \qquad (21)$$

so that $$B_{i-1,i}\rho(\nu_i) = \frac{2303\,c\delta\nu}{Nh\nu}\,\epsilon_{i-1,i}(\nu_i) = 1923\,\epsilon_{i-1,i}(\nu_i)I(\nu_i)/\bar{\nu}_i \qquad (22)$$

where $\epsilon_{i-1,i}$ is in units of $l\,\text{mole}^{-1}\,\text{cm}^{-1}$ and I in joules/cm² sec.

APPLICATIONS

For illustrative purposes let us consider the possibility of bimolecularly reacting $NH_3 + NH_3 \rightarrow N_2H_4 + H_2$ by laser activation to two excited levels. Conventionally, hydrazine is prepared either by oxidation of ammonia by sodium hypochlorite followed by reaction with NaOH[12] or reduction by chemical or electrochemical means of compounds containing N—N linkages,[13] such as nitrites or hyponitrites. Direct reaction of $NH_3$ to form $N_2H_4$ in chemical equilibrium has not been demonstrated. Provided temperature can be kept low, perhaps such a reaction could be demonstrated.

Since thermodynamic parameters needed for the algorithm which employs the equations developed above have not been experimentally determined, they must be estimated. They are summarized with the following equilibria, the first and second being activation equilibria. Data for the third reaction were obtained from the J.A.N.A.F. thermodynamic tables. Numbers are for 1 mole $N_2H_6^{\ddagger}$ or $N_2H_4$, all reactants and products being gaseous:

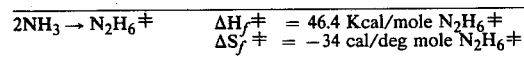

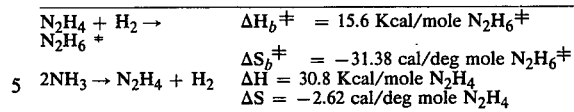

$\Delta H_f$ was empirically estimated as 27% of the energy needed to break two N—H bonds; $\Delta S_f$ was chosen to be consistent with the experimental fact that $N_2H_4$ does not decompose at 300° K but does at 600° K. $\Delta H_b^{\ddagger}$ and $\Delta S_b^{\ddagger}$ were obtained from the first and third equilibria.

Calculation of enhancement ratios requires evaluation of eqn's (9g-9i). The rotational level having the greatest population at 300° K can be calculated from the formula $$J_m = 0.5\left(\sqrt{\frac{4kT}{B}} - 1\right) \qquad (23)$$

where B is the rotational constant ($B = 9.941\,\text{cm}^{-1}$). We thus consider the following transitions $$\Psi(n_1 = 0, J_m) \rightarrow \Psi(n_1 = 2, J_m = 2)$$

$$\Psi(n_1 = 2, J_m + 2) \rightarrow \Psi(n_1 = 4, J_m + 4)$$

where $$g_{iA} = (2J_m + 4i + 1)^2$$

$$\epsilon_{iA} = (J_m + 2i)(J_m + 2i + 1)B$$

and $$\bar{\nu}_o = 0,\; \bar{\nu}_1(2\nu_1) \cong 6600\; \bar{\nu}_2(4\nu_1) \cong 13,050$$

It will be assumed that all other levels are at thermal equilibrium.

The constants $\gamma_{ijk}$ are derived from eqns (9a) and (16c) where $D_{NH_3} \cong 1.15A$, and $\mu = 8.5$ gm/mole. The minimum value of $\gamma_{ijk}$, i.e., $\gamma_{ooo}$, is given by $$\gamma_{ooo} = \frac{0.13}{\kappa' T^{3/2}}$$

and since $1/\kappa' = 3.4 \times 10^6$ (see Table I below), $\gamma_{ooo}$ is greater than unity for all values of $ijk$ over the temperature range of interest. Thus $\epsilon'_{of} = \epsilon_{of}$.

We have considered the $2\nu_1$ vibrational excitation of $NH_3$ instead of the $\nu_1$ excitation which has associated with it a much larger molar absorptivity but this is more than offset by the exponential dependence on the energy of excitation. The collision efficiency factor is difficult to predict. Since it may vary by several orders of magnitude, we will choose 1, $10^{-1}$, $10^{-3}$ to determine its effect.

Using eqns (9d) and (14) for $\kappa'$, including fundamental physical constants for $NH_3$,[7] and equation (16c) for $k_{3Ai}$ along with the estimated thermodynamics data, we obtain the parameters indicated in Table I.

TABLE I

Calculated Parameters for the Reaction $2NH_3 \rightarrow N_2H_4 + H_2$

| T° K | $1/\kappa' \times 10^{-6}$ | $k_{2fe}$ l/m sec | $F_{NH_3}$ | $\epsilon_{of}$ | $J_m$ |
|---|---|---|---|---|---|
| 300 | 3.43 | $8.9 \times 10^{-28}$ | 72.7 | 16004 | 4 |
| 400 | 3.48 | $4.5 \times 10^{-19}$ | 117.4 | 15935 | 5 |
| 500 | 3.52 | $8.2 \times 10^{-14}$ | 176.7 | 15865 | 5 |
| 600 | 3.55 | $2.8 \times 10^{-10}$ | 234.5 | 15796 | 6 |

TABLE I-continued

| \multicolumn{6}{c}{Calculated Parameters for the Reaction $2NH_3 \rightarrow N_2H_4 + H_2$} |
| --- | --- | --- | --- | --- | --- |
| T° K | $1/k' \times 10^{-6}$ | $k_{2fe}$ l/m sec | $F_{NH_3}$ | $\epsilon_{of}$ | $J_m$ |
| 700 | 3.58 | $1.0 \times 10^{-7}$ | 357.1 | 15726 | 6 |

The partition function $F_{NH_3}$ was calculated using fundamental constants supplied by Herzberg.[14]

Equation (9h) can be used to obtain $\phi_{en} = \phi_{ne}$.

Since $\epsilon_{1A}$ and $\epsilon_{2A}$ are less than $\epsilon_{of}$ but $\epsilon_{1A} + \epsilon_{2A} > \epsilon_{of}$ eqn. (10) becomes $$\phi_{nn} \cong \frac{1}{S}\left[\frac{F_A}{A_t}\right]^2 \left\{ \left[\frac{[A_{on}]}{g_{on}}\right]^2 + \frac{[A_{on}][A_{1n}]}{g_{on}g_{1n}} e^{\frac{\epsilon_{1A}}{kT}} + \frac{[A_{on}][A_{2n}]}{g_{on}g_{2n}} e^{\frac{\epsilon_{2A}}{kT}} + \left[\frac{[A_{1n}][A_{2n}]}{g_{1n}g_{2n}} + \left[\frac{[A_{2n}]}{g_{2n}}\right]^2 \right] e^{\frac{\epsilon_{of}}{kT}} \right\} \quad (25)$$

when one rotational level is pumped. Equations (16), when simultaneously solved result in $$[A_{on}] = \frac{D_1 D_2 \{[A_{oe}] + [A_{ie}] + [A_{2e}]\} - [A_t] k_{51}(W_2 + D_2)\{k_{51}(W_2 + D_2) + k_{52}D_1\}}{D_1 D_2 + W_1 W_2 + W_1 D_2}, \quad (26)$$

$$[A_{1n}] = \frac{W_1[A_{on}] + k_{51}[A_t]}{D_1}, \quad (27)$$

and $$[A_{2n}] = \frac{W_2[A_{in}] + k_{52}[A_t]}{D_2}, \quad (28)$$

where $D_i = k_{2A_iA}[A_t] + k_{3AA}[A_t] + W_i + A_{i,i-1} + k_4$ (29)
and $W_i = B_{i-1,i}\rho(v_i)$. (30)

For simplicity, we assume $\epsilon(v_1) = \epsilon(v_2)$ so that $$B_{1,2}\rho(v_2) = \overline{v}_1/\overline{v}_2 B_{o,1}\rho(v_1) \quad (31)$$

(see eqn. 22).

Figure 2:
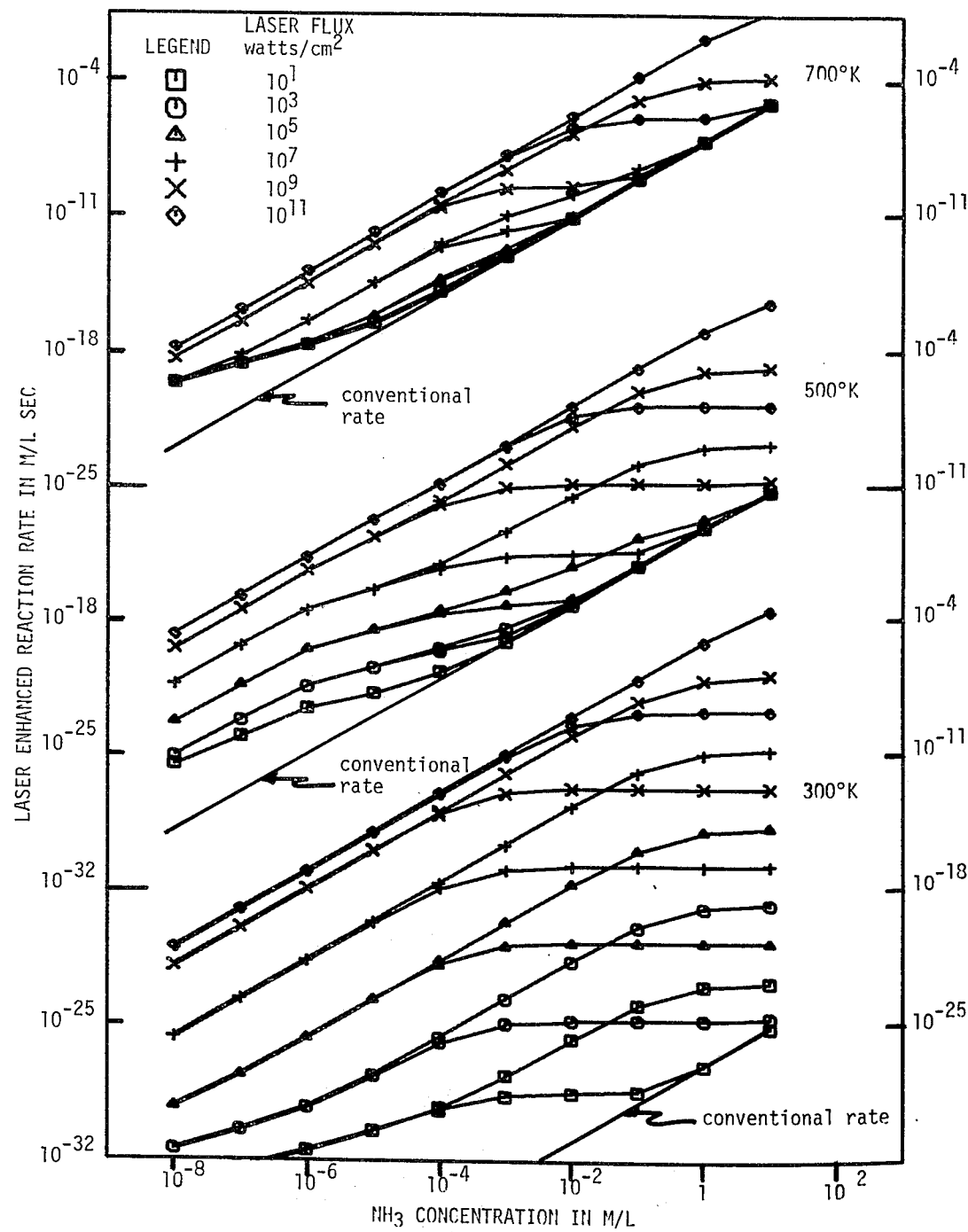

FIG. 1 summarizes various calculated enhancement ratios using equations for $\phi_{AA}$ developed above. An attempt has been made to illustrate the effects of temperature, collision efficiency, concentration of reactants and laser intensity. FIG. 2 is perhaps more useful than FIG. 1 in that it shows directly the calculated rate of bimolecular reaction as a function of the same variables. Reactions at three temperatures are summarized. The conventional bimolecular rates are calculated from estimates of enthalpy and entropy of activation are indicated by the lines at the bottom of each temperature grouping. At high pressures other lines become asymptotic as $\phi_{AA}$ approaches unity.

The range of rate enhancement is much greater at lower temperatures. It will also be noticed that the upper limit of reaction rates is about the same irrespective of temperature. Examples at $[A_t]$ 32 $10^{-2}$ m/l are $10^{-7.5}$ at 300° K, $10^{-6}$ at 500° K and $10^{-5}$ at 700° K. This suggests that it would be advantageous to effect reactions at as low temperature as possible. High chemical selectivity is more probable at lower temperatures, but, as will be shown later, the energy expenditure may be prohibitive.

The effect of the collision efficiency parameter $f_{AA}$ is also shown in FIG. 2. The upper limit $f_{AA} = 1$ causes a break from the more favorable curve representing $f_{AA} = 10^{-3}$ at $[A_t] = 10^{-4}$ m/l. Reasonable rates might be expected to lie between the limits indicated by the two lines.

The energy expended by a continuous laser in a second's time is given by $$E = I(v_l)A \quad (32)$$

where A is the area of the laser beam in cm². The amount of product formed in the same time due to laser enhancement is $$P = k_{2ef}[A_t]^2(\phi_{AA} - 1)V \times 10^{-3} \quad (33)$$

the volume V is AL; L is the length of the cell in cm.

The absorbance of energy is given by $$Ab = \epsilon(v_1)[A_t]L \quad (34)$$

Assuming a cell long enough to absorb 90% of the energy we obtain $$L = \frac{.9}{\epsilon(v_1)[A_t]} \quad (35)$$

so that $$P = .9 \frac{k_{2fe}[A_t](\phi_{AA} - 1)}{\epsilon(v_1)} A \times 10^{-3} \quad (36)$$

Figure 3:
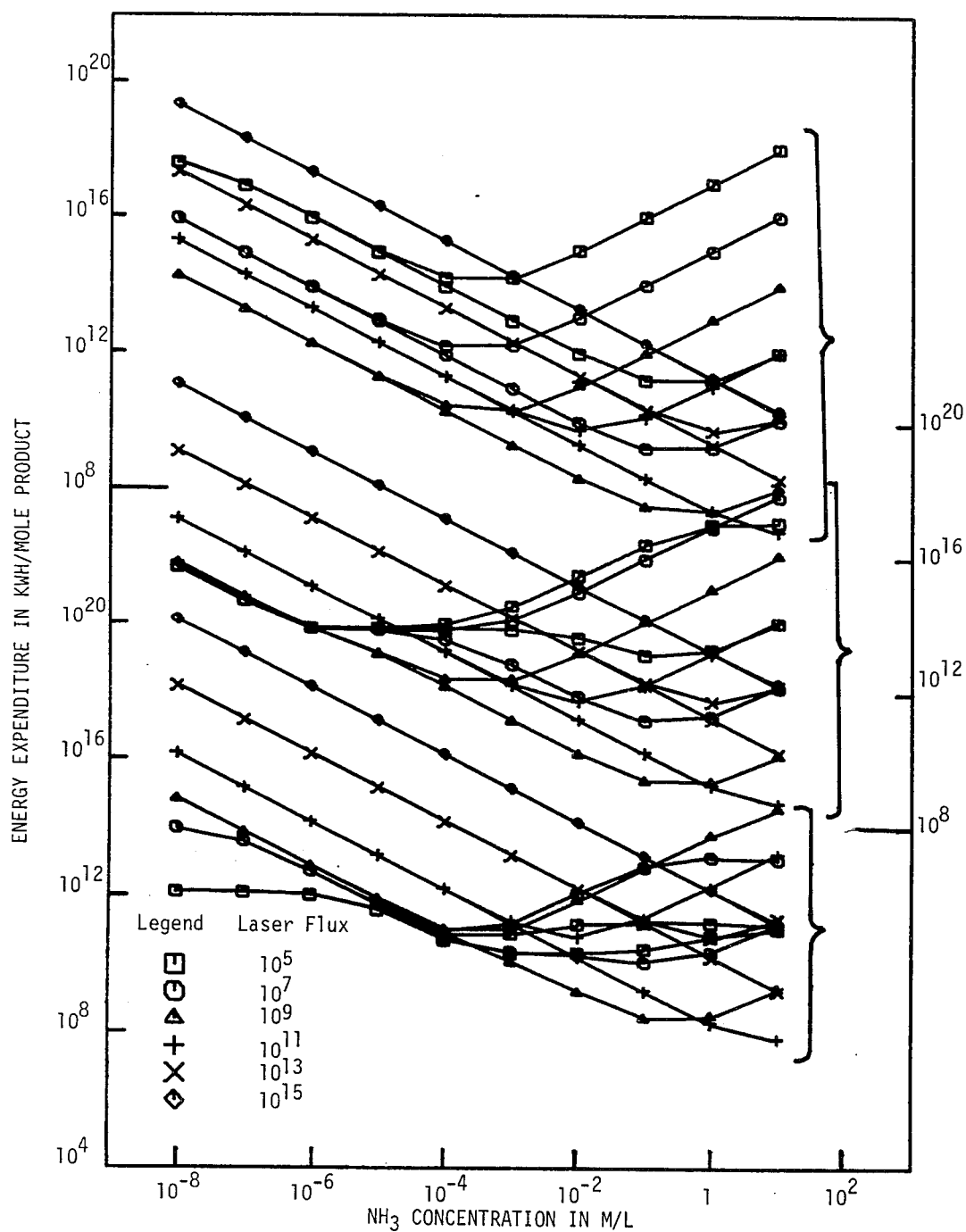

By using the proper conversion factor for KWH we obtain the equation that was used to calculate ordinate values for FIG. 3, namely $$E_X = \frac{(n_L - 1) I(v_1)\epsilon(v_1)}{3.24 \times 10^3 k_{2fe}[A_t](\phi_{AA} - 1)}, \quad (37)$$

being pumped. Note that this equation does not include power inefficiencies in producing the laser nor any estimates of unwanted side reactions other than those considered in the steady state computation of $\phi_{AA}$.

The first important result to be gleaned from FIG. 3 is that energy expenditure is much too great to allow the reaction $2NH_3 \rightarrow N_2H_4 + H_2$ to be considered on a commercial basis. This will not be the case for a large class of reactions, however, which wil be discussed later.

The second point is that to be efficient, one must utilize as much thermal energy as possible. Choice of temperature ideally is to be influenced by consideration of side reactions, always more bothersome at high temperatures, and energy expenditure. More discussion will follow in the section on parametric optimization.

The third point is that there is an optimum laser intensity at certain temperatures and concentrations. To illustrate this, we can examine the curves for 300° K at $[A_t] - 10^{-2}$ m/l. We see that energy expenditure decreases from $\rho = 10^5$ to $10^9$ but minimizes and increases again from $\rho = 10^{11}$ to $10^{15}$.

Finally it should be noticed that the value for $f_{AA}$ has a pronounced effect on energy consumption. As it decreases in value energy consumption also decreases in the higher concentration ranges.

Very high powered lasers are not yet available which operate in the continuous mode. Furthermore, unless proper precautions are taken, temperatures may rise abruptly and even explosively, thereby nullifying the advantage of selective reaction. Both of these problems may be minimized by using pulsed lasers.

Non-Steady State Formulation

If a pulsed laser were used for excitation, steady state approximations would not be appropriate. Since the differential equations required for the problem cannot be solved in closed form, let us consider the formulation of a simple computer algorithm for two-laser excitation of a reactant A so that it will react with B (which may be another A) to form a product C + D. We have written more exact algorithms than presented here for the study of various phasing of the laser pulses, modulation, and anharmonicity but they quickly become expensive to execute. As before, we will assume that all quantum states are in thermal equilibrium except those being explicitly perturbed by the laser light, i.e. three levels of one of the high energy fundamental modes.

The rate of formation of component $[A_{in}]$ is given by $$\frac{d[A_{in}]}{dt} = B_{i-1,i}\rho(\nu_i)\{[A_{i-1,i}] - [A_{in}]\} + k_{5i}[A_i] - \{k_{2A_iB}[B_i] + \sum_\alpha k_{3A\alpha}[M_\alpha] + A_{i,i-1} + k_4\}[A_{in}] \quad (38)$$

An approximation to the temperature change is given by $$\frac{dT}{dt} = \sum_\alpha \frac{[M_\alpha]V}{C_p} \left( k_{3A\alpha} \sum_{i > j}^{n_A} \{[A_{in}] - [A_{ie}] - [A_{jn}] + [A_{je}]\}(\epsilon_{iA} - \epsilon_{jA}) \right. \\ \left. + k_{3B\alpha} \sum_{i > j}^{n_B} \{[B_{in}] - [B_{ie}] - [B_{jn}] + [B_{je}]\}(\epsilon_{iB} - \epsilon_{jB}) \right) \quad (39)$$

where $C_p$ is the heat capacity of the reactor plus contents (cal/deg) and $\epsilon_{iA}$ is expressed in cal/mole.

By choosing the appropriate $\Delta t$ such that reasonably small fractional changes result in concentrations $[A_{in}]$ and $8 B_{jn}]$ and $[A_i]$ during any time increment, we can follow the reaction iteratively through the equations $$[A_{in}]_{t+\Delta t} = [A_{in}]_t + \left[\frac{d[A_{in}]}{dt}\right]_t \Delta t \quad (40)$$

$$[B_{jn}]_{t+\Delta t} = [B_{jn}]_t + \left[\frac{d[B_{jn}]}{dt}\right]_t \Delta t \quad (41)$$

$$T_{t+\Delta t} = T_t + \left[\frac{dT}{dt}\right]_t \Delta t \quad (42)$$

and $$[C_i]_{t+\Delta t} = [C_i]_t + \left[\frac{d[C_i]}{dt}\right]_t \Delta t$$

Figure 4:
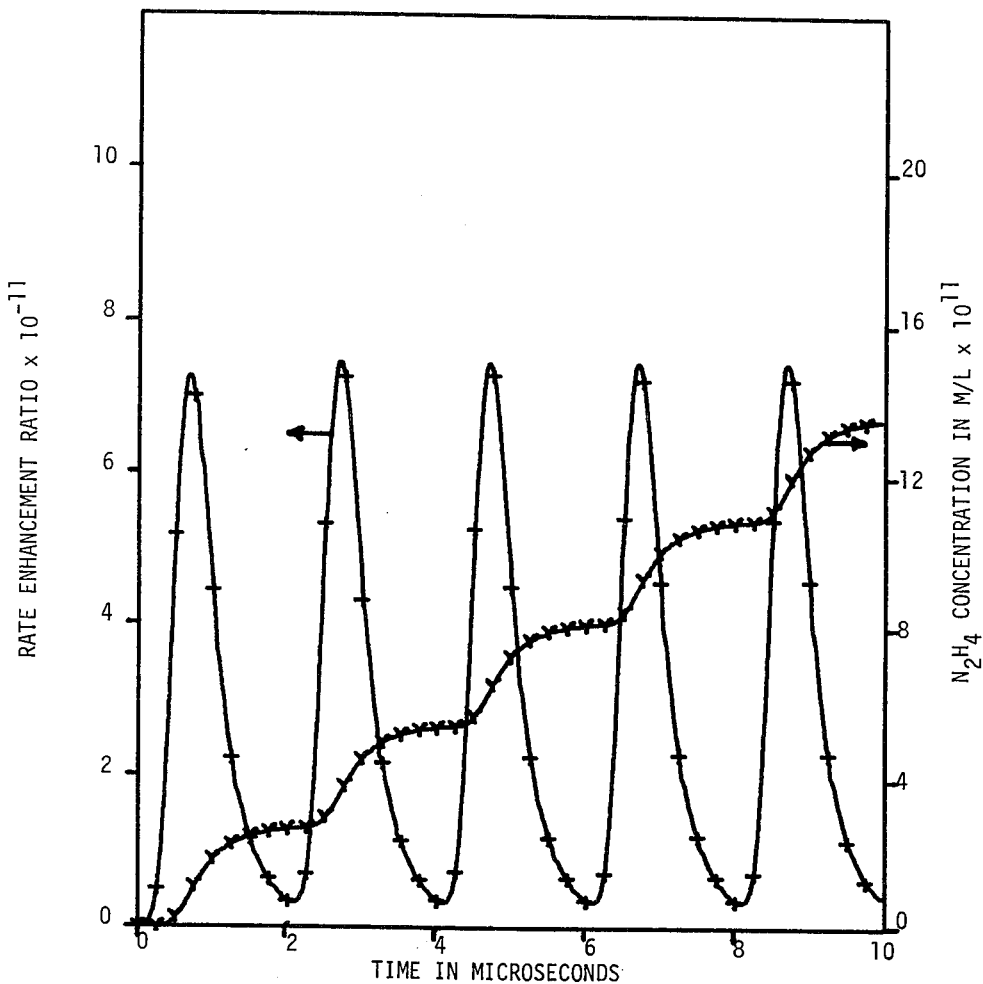
Figure 5:
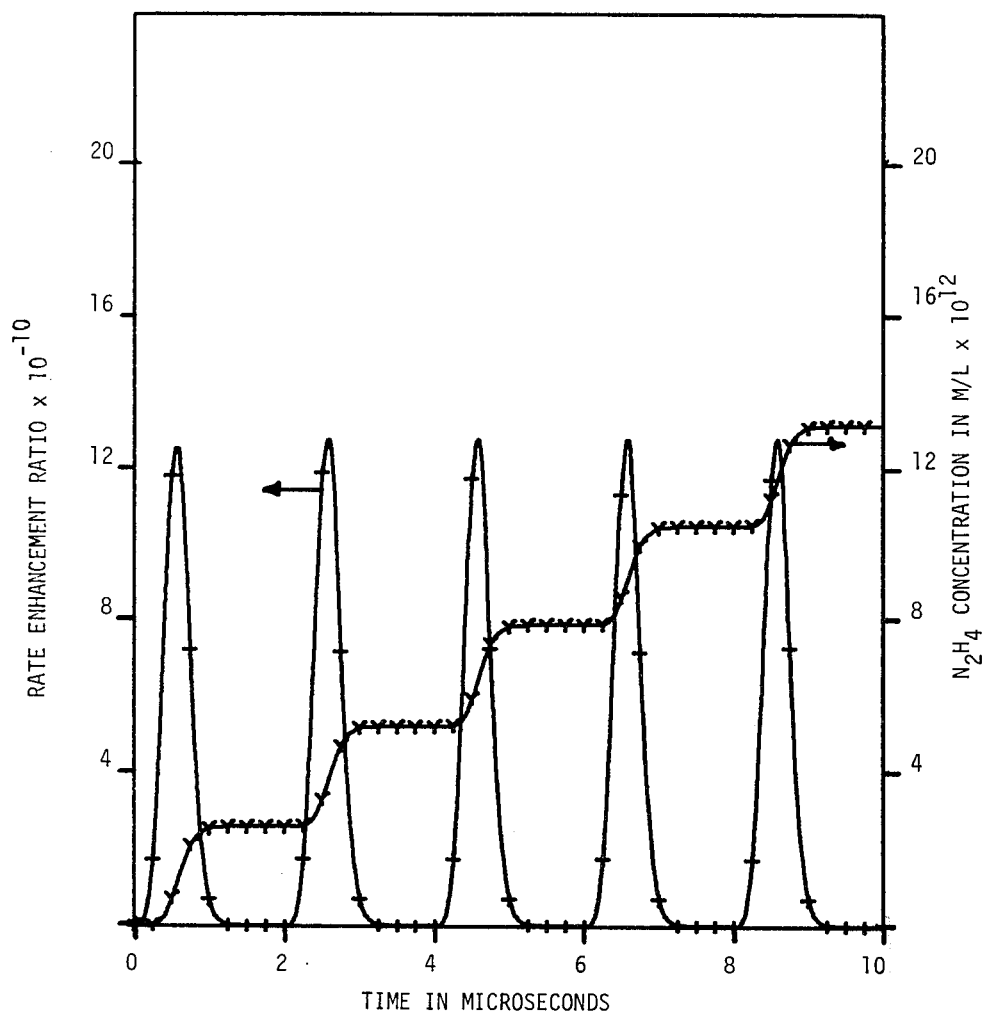
Figure 6:
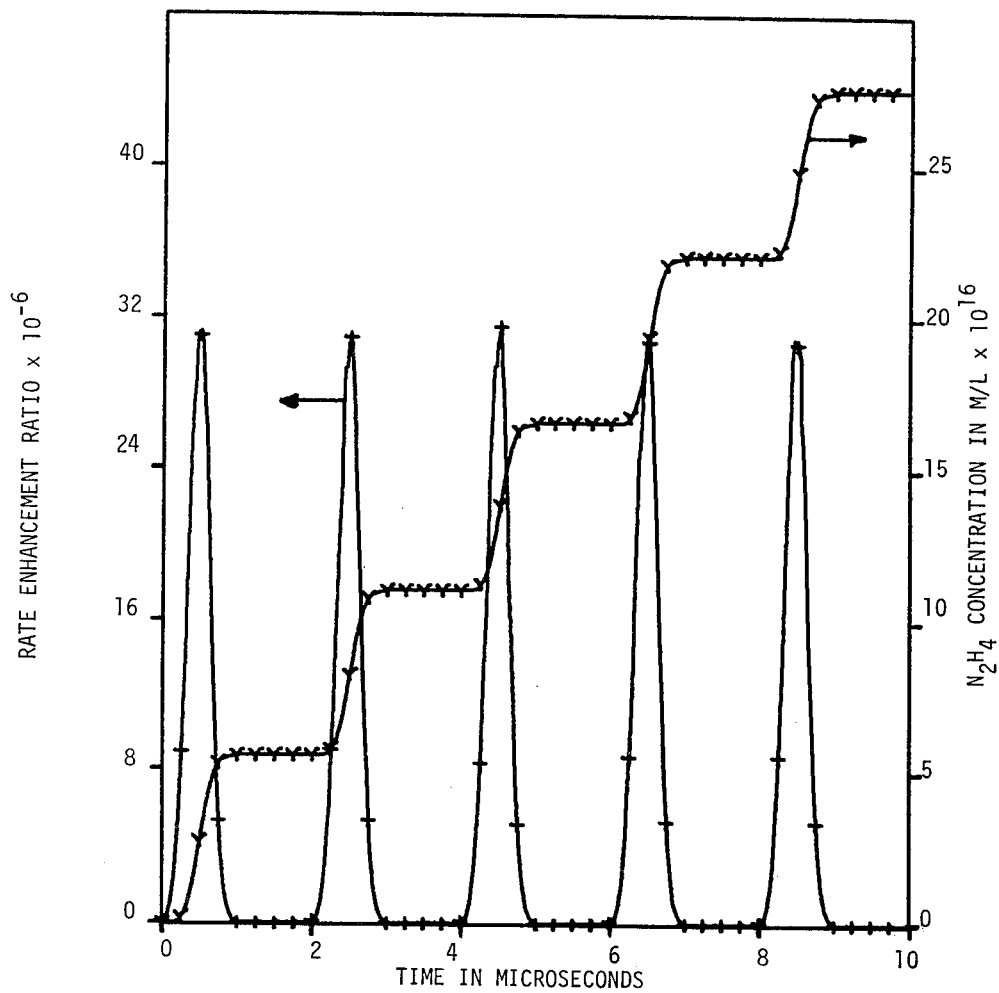

FIGS. 4–8 were calculated using the non-steady state equations derived above and are included to illustrate different points. FIGS. 4–6 demonstrate the effect of the magnitude of the internal rearrangement rate which is expected to be of the order $10^{+7} \sec^{-1}$. For FIG. 4, this rate was assumed to be $10^5 \sec^{-1}$. FIG. 5 is thought to represent the more probable case where $k_4 = 10^7$. FIG. 6 represents the condition where the internal rearrangement rate is $10^9 \sec^{-1}$. It must be pointed out that these figures represent the maximum expected effect since a molecule with a quantum of vibrational energy disbursed among $n$ degrees of freedom should still be more reactive than one in thermal equilibrium, though not as reactive as if the quantum were in one degree of freedom.

It will be noticed from FIG. 4 that the effect of a laser pulse lingers when the internal rearrangement rate is slow. As this rate increases however, the population of excited molecules readjusts rapidly with respect to the pulse time. The rate-enhancement consequently decreases and the energy consumed per mole of product increases in a non linear fashion.

Figure 7:
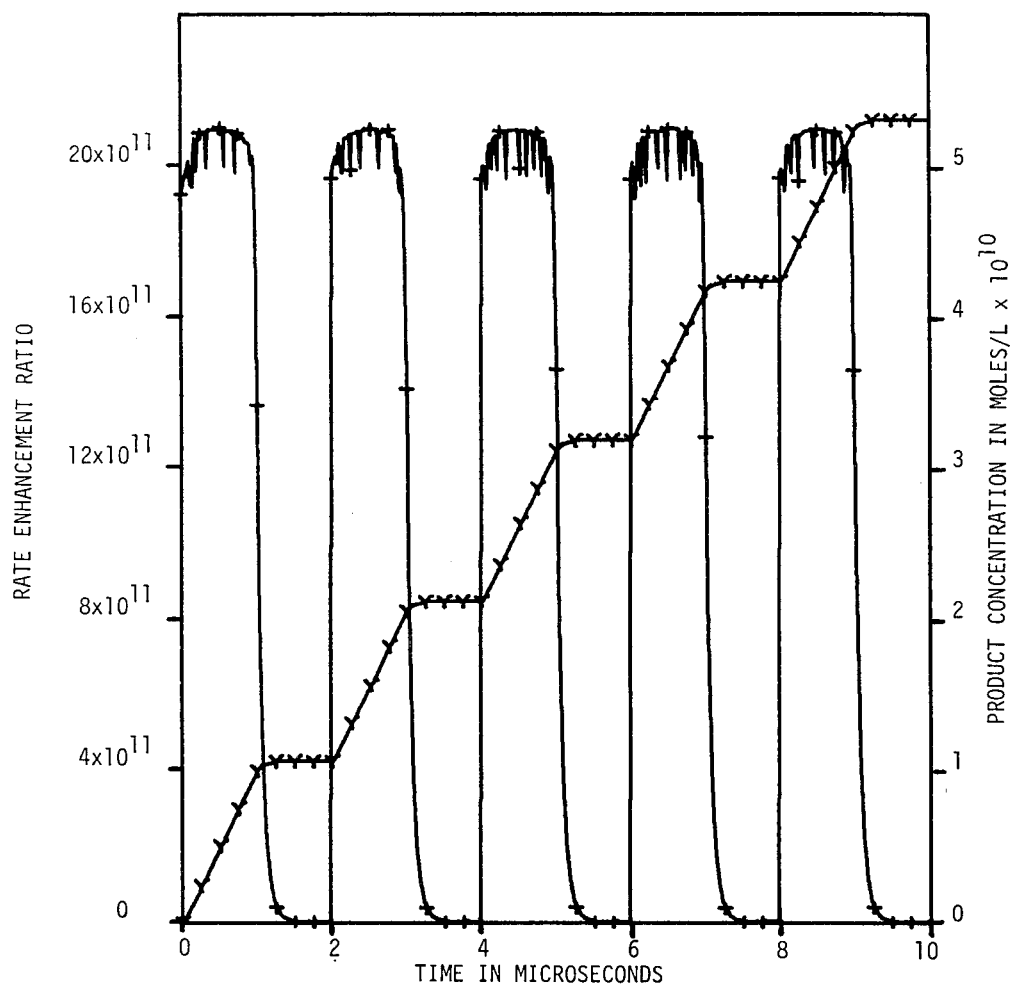

FIG. 7 illustrates the reason for increased energy consumption as the laser intensity is increased. When the upper levels are saturated, there is no net absorption of laser energy, and it passed through unused. What this threshold value is depends, of course, on the other dynamic parameters in equation (38). Since $B_{i,i+1}$ and $\rho(\nu_i)$ always occur as products, it follows that if $\epsilon$ increases by a factor $f$, the threshold value of $\rho$ will decrease by the factor $1/f$.

Figure 8:
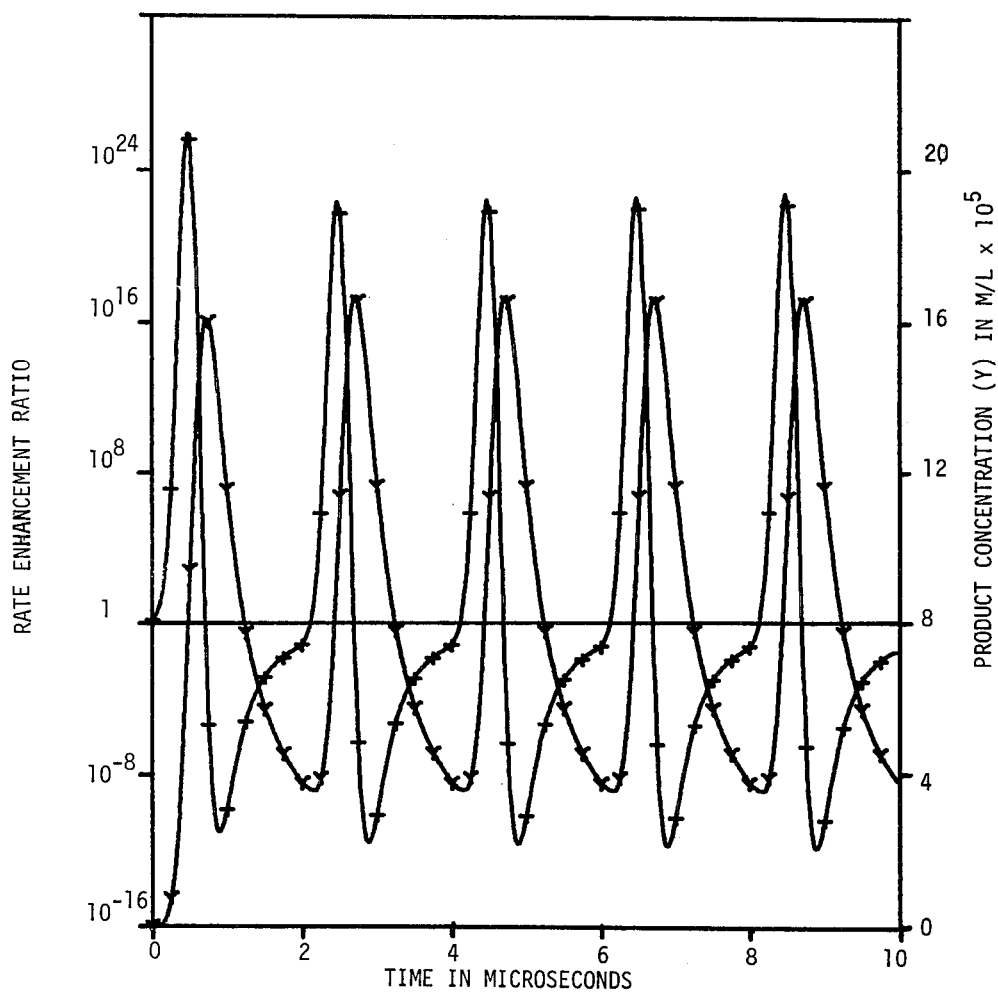

FIGS. 4–7 illustrate the fact that pulsed lasers can be used to enhance reactions. In none of the cases calculated was temperature increases a problem. FIG. 8 has been included to illustrate several points of a practical nature. The Gibbs free energy of activation for the hypothetical reaction $2A \rightarrow C+D$ was taken to be 30 Kcal/mole and the Gibbs free energy for the reaction was taken to be 20 Kcal/mole. In other words, the Gibbs activation energy for the reverse process is 10 Kcal/mole. At 500° K $k_{fe} = 33$ moles/1 sec, $k_{be} = 7.7 \times 10^5$ and $[C_{eq}] = 1.1 \times 10^{-6}$ m/l. Fast reactions were chosen so that the effect of approach to equilibrium could be demonstrated in 10 microseconds. The first pulse would create a concentration $[C] = 1.9 \times 10^{-5}$. In other words, it would push the reaction beyond the equilibrium point. Then during recovery of the laser the back reaction would set in. This suggests that by judicious experimental design it is possible to drive reactions beyond equilibrium, then obtain the kinetics of the back reaction by watching the decay to equilibrium. If the back reaction is slow compared to the laser recovery time or if the laser is operated in the continuous mode, reactions may be driven beyond the equilibrium point by the factor $\phi_{AB}$. Table II illustrates this point for the ammonia-hydrazine reaction at various temperatures using both single photon (1-2,2-3) and double photon (1-3,3-5) excitations. In each case, the initial pressure of $NH_3$ was 1 atm. For double-photon transitions, the laser frequencies were taken to be 6600 cm$^{-1}$ and 6450 cm$^{-1}$; the second, being an estimate, was lower to account for anharmonicity. For single photon transitions the corresponding frequencies were 3336 cm$^{-1}$ and 3264 cm$^{-1}$. The frequency 3335.9 is that of the asymmetric stretch of $NH_3$. The peak laser output was sufficient to saturate the pumped levels. It will be noticed, for example, that by using two double photon excitations, it appears possible to drive a reaction to virtual completion (0.4 atm $N_2H_4$) in 28 sec at 126° C.

TABLE II
Summary of Theoretical Calculations on the Laser Activated Bimolecular Reaction $2NH_3 \rightarrow N_2H_4 + H_2$

| | | TEMPERATURE °C | | | | |
|---|---|---|---|---|---|---|
| | | 26.8 | 126.8 | 226.8 | 326.8 | 426.8 |
| Initial Forward Rates | T | $1.5 \times 10^{-30}$ | $4.2 \times 10^{-22}$ | $4.9 \times 10^{-17}$ | $1.2 \times 10^{-13}$ | $3.1 \times 10^{-11}$ |
| | S | $3.0 \times 10^{-11}$ | $1.7 \times 10^{-8}$ | $1.8 \times 10^{-8}$ | $9.4 \times 10^{-8}$ | $2.9 \times 10^{-7}$ |
| (m/l sec) | D | $8.3 \times 10^{-4}$ | $8.2 \times 10^{-4}$ | $8.1 \times 10^{-4}$ | $8.1 \times 10^{-4}$ | $8.0 \times 10^{-4}$ |
| Equilibrium $N_2H_4$ Concentration | T | $1.3 \times 10^{-13}$ | $6.1 \times 10^{-11}$ | $2.3 \times 10^{-9}$ | $2.6 \times 10^{-8}$ | $1.4 \times 10^{-7}$ |
| | S | $5.5 \times 10^{-4}$ | $1.2 \times 10^{-4}$ | $4.5 \times 10^{-5}$ | $2.4 \times 10^{-5}$ | $1.3 \times 10^{-5}$ |
| (m/l) | D | $2.0 \times 10^{-2}$ | $1.3 \times 10^{-2}$ | $5.3 \times 10^{-3}$ | $1.9 \times 10^{-3}$ | $6.6 \times 10^{-4}$ |
| Time To 50% Completion | T | $8.6 \times 10^{16}$ | $1.4 \times 10^{11}$ | $4.8 \times 10^{7}$ | $2.2 \times 10^{5}$ | $4.6 \times 10^{3}$ |
| | S | $2.1 \times 10^{7}$ | $7.9 \times 10^{4}$ | $2.7 \times 10^{3}$ | $2.6 \times 10^{2}$ | 51 |
| (sec) | D | $1.2 \times 10^{2}$ | 28 | 8.8 | 2.6 | 0.94 |
| Back Reaction Rate At Equilibrium Composition | T | $1.5 \times 10^{-30}$ | $4.2 \times 10^{-22}$ | $4.9 \times 10^{-17}$ | $1.2 \times 10^{-13}$ | $3.1 \times 10^{-11}$ |
| | S | $2.8 \times 10^{-11}$ | $1.6 \times 10^{-9}$ | $1.8 \times 10^{-8}$ | $1.1 \times 10^{-7}$ | $3.2 \times 10^{-7}$ |
| (m/l sec) | D | $3.7 \times 10^{-8}$ | $1.8 \times 10^{-5}$ | $2.5 \times 10^{-4}$ | $6.4 \times 10^{-4}$ | $6.4 \times 10^{-4}$ |

T = Thermally equilibrated conditions
S = Single level excitations, i.e., $1 \rightarrow 2$, $2 \rightarrow 3$ $\psi(0,4) \rightarrow \psi(1,5) \rightarrow \psi(2,6)$
D = Double level excitations, i.e., $1 \rightarrow 3$, $3 \rightarrow 5$ $\psi(0,4) \rightarrow \psi(2,6) \rightarrow \psi(4,8)$

PARAMETRIC OPTIMIZATION

The foregoing mathematical development incorporates a number of parameters the choices of which are critical to the successful enhancement of chemical reactions by lasers. The concentration of reactants for example should be as high as possible for practical reasons. However, if they are too high, temperature rise may become uncontrollable. The intensity of the laser should be rather high, yet should not exceed a certain maximum, depending of course on the system, temperature and concentration of reactants. The excitation frequencies should be as large as possible consistent with the activation energy. Whether single or double photon excitations are desirable from a point of view of economy of energy expenditure depends also on the activation energy. We are now in a position to derive expressions which can aid in choosing these parameters.

Temperature Control

If the vibrational → translational process (process 1) competes favorably with the reaction $$A^* \rightarrow B \text{ (process 2)}$$

the temperature is predicted to increase significantly and in some cases explosively. The rate of temperature increase is given by equation (39). Under conditions of saturation pumping this equation is simplified:

$$\frac{dT}{dt} = \sum_\alpha \frac{[M_\alpha]V}{C_p} \left( \frac{k_{3A\alpha}[A_T]}{F_A} \sum_{i>j}^{n_A} (g_{jA}e^{-\frac{\epsilon_{jA}}{kT}} - g_{iA}e^{-\frac{\epsilon_{iA}}{kT}})(\epsilon_{iA} + \epsilon_{jB}) + \frac{k_{3B\alpha}[B_T]}{F_B} \sum_{i \neq j}^{n_B} (g_{jB}e^{-\frac{\epsilon_{jB}}{kT}} - g_{iB}e^{-\frac{\epsilon_{iA}}{kT}})(\epsilon_{iB} + \epsilon_{jB}) \right)$$

which represents the maximum temperature rise which can be expected. If only A is pumped, $n_B = 0$. Furthermore, V can be suitably approximated by

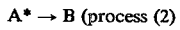

$$\frac{J}{I\epsilon_A[A_T]}$$

where J is the toal energy output of the laser per second. Thus $$\frac{dT}{dt} \cong \sum_\alpha \frac{k_{3A\alpha}[M_\alpha]hJcN}{C_p I\epsilon_A} \sum_{i>j}^{n_A} (g_{jA}e^{-\frac{\epsilon_{jA}}{kT}} - g_{iA}e^{-\frac{\epsilon_{iA}}{kT}})(\bar{v}_{jA} - \bar{v}_{iA}) \cong \sum_\alpha 2.8 \times 10^{-3} \frac{k_{3A\alpha}[M_\alpha]J}{C_p I\epsilon_A} \sum_{i>j}^{n_A} (g_{jA}e^{-\frac{\epsilon_{jA}}{kT}} - g_{iA}e^{-\frac{\epsilon_{iA}}{kT}})(\bar{v}_{jA} - \bar{v}_{iA})$$

(44)

where $k_{3A\alpha}[M_\alpha]$ is in $sec^{-1}$, Cp in cal/deg and $\epsilon A$ in l/mole cm.

Optimum Laser Intensities and Minimum Energy Expenditures

We define the optimum laser intensity as that intensity which results in the minimum expenditure of energy per mole of product. For complex systems, it is not easily expressible in closed form and must be determined for each case by application of the equations developed in the prior sections. For the simple reaction $2A \rightarrow B + C$ optimum laser intensities can be derived by evaluating the condition under which the derivative of eqn (37) is zero. When $\phi_{AA} >> 1$, $E_x \cong C_1I/\phi_{AA}$, $\phi_{AA} = C_2[A_{in}]^2$ and $[A_{in}] = (C_3[A_{i-iA}]I + C_4[A_{ie}])/(2C_3I + C_4)$ where $[A_{in}]$ is the concentration of the highest level non-thermal state. The coefficients $C_i$ are not functions of $\rho$. It follows that $$\frac{dE_x}{dI} \cong C_1 [\phi^{-1} - \phi^{-2}I\frac{d\phi}{dI}] = 0 \text{ so that } \frac{d\phi}{dI} = \frac{\phi}{I}.$$

Since $$\frac{d\phi}{dI} = \frac{2\phi}{[A_{in}]} \frac{d[A_{in}]}{dI},$$

it follows that $$\frac{d[A_{in}]}{dI} = \frac{[A_{in}]}{2I}$$

for optimum laser intensities. Evaluation of this equation leads to the expression for the optimum I. To a good approximation, since terms with $A_{ie}$ are negligible compared to terms including $A_{oe}$, $$I_{opt} = \frac{C_4}{C_3} = \frac{k_{5i}[A_i]\bar{v}_i}{192.3\,[A_{ie}]\epsilon_{i-1,i}} \quad (45)$$

This equation can be substituted into equation (16) to yield a value for the optimum concentration of [$A_{in}$]. Assuming that a two level process is in question, we arrive at the values.

[$A_{on}$] = 9/13[$A_{oe}$]

[$A_{in}$] = 3/13[$A_{oe}$]

[$A_{2n}$] = 1/13[$A_{oe}$]

When $\epsilon_{1A} < \epsilon_{2A} \leq \epsilon'_{of}/2$ we can approximate $\phi_{AA}$ by including only the $\phi_{nn}$ term in eqn 9g:

$$\phi_{AA} \simeq \frac{\left(\frac{g_{oA}}{13 g_{2A}}\right)^2 e^{\frac{2(\epsilon_{2A}-\epsilon_{oA})}{kT}}}{S}$$

Finally, by combining the relationship $$k_{2ef} = \frac{kT}{h}\,e(RT)e^{\frac{\Delta S_p^{\ddagger}}{R}}\,e^{-\frac{\epsilon_{of}^*}{kT}},$$

*See eqn (40) of Ref. 4. The experimental activation energy is related to $\epsilon_{of}$ by the approximate relationship $\epsilon_{act} \simeq \epsilon_{of} - kT$.

where $\Delta S_p^{\ddagger}$ is the entropy of activation of standard state 1 atmosphere, and equation (16) with equation (37), we obtain $$E_x = \frac{5.84 \times 10^{-14} S(k_{A2A} + k_{3AA} + k_{4i}/[A_t])\,\bar{v}_2 g_{2A}^2\, e^{\frac{-2(\epsilon_{2A} - \frac{\epsilon_{of}}{2} - \epsilon_{oA})}{kT}}}{g_{oe}^2 T^2\, e^{\frac{\Delta S_p^{\ddagger}}{R}}} \quad (46)$$

where $E_x$ is expressed in KWH/mole of product. At pressures below 1 atmosphere the term $k_{4i}/[A_t]$ predominates and $E_x$ is inversely proportional to [$A_t$].

Figure 9:
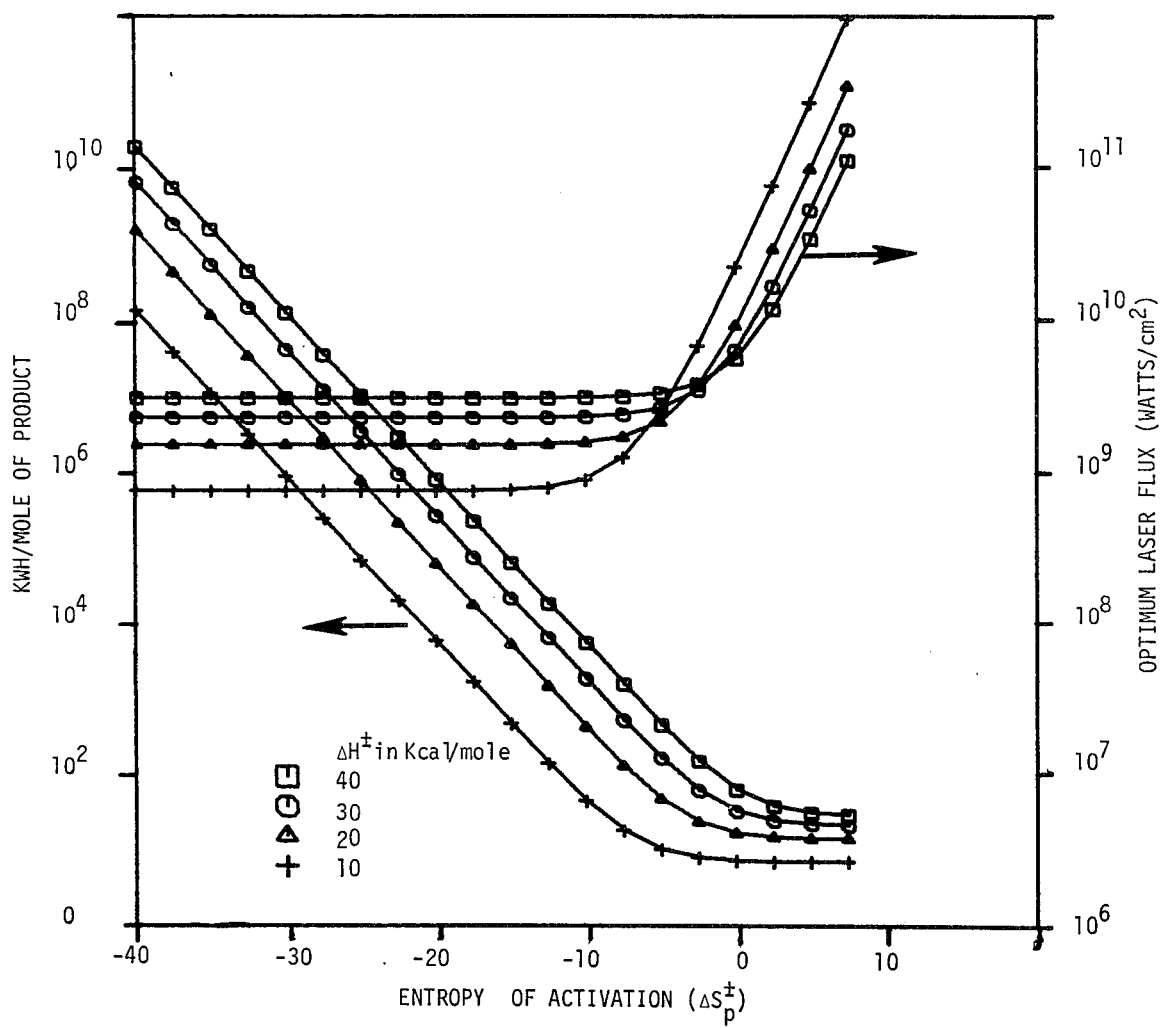
Figure 10:
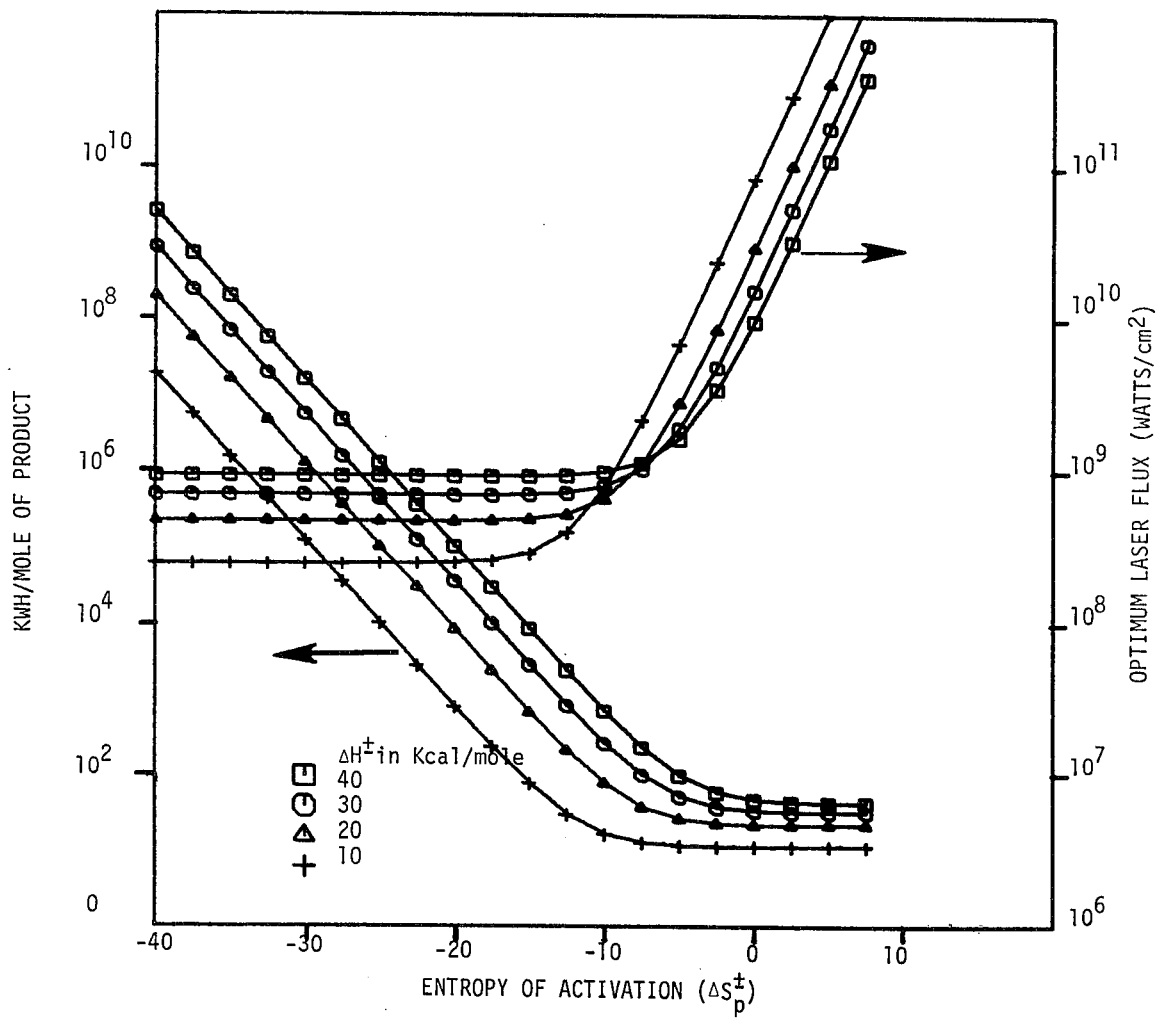

FIGS. 9 and 10 have been calculated from equation (46) assuming that the laser exitation frequency is such that $$\epsilon_{2A} = \frac{\epsilon_{of}}{2} - \epsilon_{oA}.$$

Molecular constants for $NH_3$ were used but are of relatively minor consequence in the calculation. Both figures are included to illustrate the effect of temperature.

If the laser excitation frequency is such that $h\nu_i = \epsilon'_{of}/2$ then the term $\phi_{ne}$ becomes important:

$$\phi_{AA} \simeq 1 + \frac{1}{S}\left[\left(\frac{g_{oe}}{13 g_{2e}}\right) + \left(\frac{g_{oe}}{13 g_{2e}}\right)^2\right] e^{\frac{\epsilon'_{of}}{kT}}$$

$$\simeq 1 + \frac{1}{S}\,\frac{g_{oe}}{13 g_{2e}}\,e^{\frac{\epsilon'_{of}}{kT}}$$

The effect is large enough to decrease $E_x$ by a factor $g_{oe}/13g_{2e}$.
For $NH_3$ the factor is 0.037.

UNIMOLECULAR REACTIONS

It is clear from Table III that not many bimolecular laser induced reactions will be of economic importance. Only those products of high economic value, such as isotopes, can be seriously considered. As will be seen below, such restrictions do not apply to unimolecular reactions.

The classical Lindemann scheme has been used to explain unimolecular reactions by the mechanism:

$$A + A \underset{k_2}{\overset{k_1}{\rightleftarrows}} A + A$$

$$A \xrightarrow{k_3} B$$

where under steady state approximation, $$\frac{dB}{dt} = \frac{k_1 k_3 A^2}{k_2 A + k_3}.$$

When $$k_2 A >> k_3, \quad \frac{dB}{dt} = \frac{k_1 k_3}{k_2} A = k_{lfe} A.$$

The constant $k_{lfe}$ can be expressed as

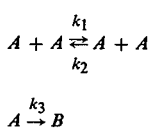

$$k_{lfe} = k\,\frac{kT}{h}\,\frac{F_B^{\ddagger\ddagger}}{F_A}\,e^{-\frac{\epsilon_o}{kT}}$$

Table III

Approximate Expected Minimal Energy Expenditure for Bimolecular Reactions at 1 atm and 300° K

| Ref. | Bimolecular Gaseous Reaction | $E_{act}$ Kcal/mole | A l/mole sec | $k_{2fe}$ at 300° K l/mole sec | (a) $\Delta S_p^{\ddagger}$ eu at 300° K | (b) $\Delta H^{\ddagger}$ Kcal/mole | (c) $k_{2fe}\,\phi_{AB}$ l/mole sec | (d) $E_x$ KWH/mole |
|---|---|---|---|---|---|---|---|---|
| 15 | $HI + HI \rightarrow H_2 + I_2$ | 45.9 | $1.6 \times 10^{10}$ | $5.9 \times 10^{-24}$ | 22.2 | 43.2 | $1.6 \times 10^2$ | $2 \times 10^5$ |
| 16 | $NO_2 + NO_2 \rightarrow 2NO + O_2$ | 25.1 | $7.0 \times 10^8$ | $3.6 \times 10^{-10}$ | 28.4 | 22.3 | $2.4 \times 10^0$ | $7 \times 10^6$ |
| 17 | $NOCl + NOCl \rightarrow 2NO + Cl_2$ | 25.8 | $5.7 \times 10^{10}$ | $9.0 \times 10^{-9}$ | 19.7 | 23.0 | $5.6 \times 10^2$ | $4 \times 10^3$ |
| 18 | $CO + Cl_2 \rightarrow COCl + Cl$ | 51.3 | $5.5 \times 10^9$ | $2.3 \times 10^{-28}$ | 24.3 | 48.5 | $5.4 \times 10^1$ | $4 \times 10^5$ |
| 19 | $H\cdot + O_2 \rightarrow OH\cdot + O\,.$ | 17.0 | $1.6 \times 10^8$ | $6.5 \times 10^{-5}$ | 31.4 | 14.2 | $1.6 \times 10^0$ | $7 \times 10^5$ |
| 20 | $Cl\,. + COCl_2 \rightarrow Cl_2 + COCl\,.$ | 20.5 | $5.5 \times 10^{11}$ | $6.3 \times 10^{-4}$ | 15.2 | 17.8 | $5.4 \times 10^3$ | $2 \times 10^2$ |
| 21 | $Br\,. + CH_4 \rightarrow H\,Br + CH_3\,.$ | 17.8 | $2.6 \times 10^{10}$ | $2.7 \times 10^{-3}$ | 21.3 | 15.1 | $2.4 \times 10^2$ | $2 \times 10^3$ |
| 15 | $I\,. + H_2 \rightarrow HI + H\,.$ | 33.4 | $9.7 \times 10^{10}$ | $4.5 \times 10^{-14}$ | 18.6 | 30.6 | $9.6 \times 10^2$ | $7 \times 10^3$ |
| 22 | $2C_2F_4 \rightarrow$ Cyclo $C_4F_8$ | 25.6 | $6.6 \times 10^7$ | $1.5 \times 10^{-11}$ | 33.1 | 22.8 | $6.7 \times 10^{-1}$ | $4 \times 10^6$ |
| 23 | 2 Butadiene $\rightarrow$ vinylcyclo hexene | 23.1 | $4.0 \times 10^6$ | $5.9 \times 10^{-11}$ | 38.7 | 20.3 | $3.9 \times 10^{-2}$ | $7 \times 10^7$ |
| 23 | Butadiene + vinylcyclo hexene $\rightarrow$ trimer | 38.0 | $1.3 \times 10^{11}$ | $2.7 \times 10^{-17}$ | 18.0 | 35.3 | $1.3 \times 10^3$ | $7 \times 10^3$ |
| 24 | $HI + RI \rightarrow HR + I_2$ | | | | | | | |
| | R = $CH_3$ | 33.4 | $1.6 \times 10^{12}$ | $7.4 \times 10^{-13}$ | 13.0 | 30.6 | $5.6 \times 10^3$ | $4 \times 10^2$ |
| | R = $C_2H_5$ | 29.8 | $4.0 \times 10^{11}$ | $7.8 \times 10^{-11}$ | 15.8 | 27.1 | $4.0 \times 10^3$ | $8 \times 10^2$ |
| | R = $C_3H_7$ | 29.8 | $1.0 \times 10^{11}$ | $1.9 \times 10^{-11}$ | 18.6 | 27.1 | $9.7 \times 10^2$ | $4 \times 10^3$ |

Table III-continued

| | | $E_{act}$ | A | | (a) $\Delta S_p^{\ddagger}$ | (b)$\Delta H^{\ddagger}$ | (c) | (d) $E_x$ |
|---|---|---|---|---|---|---|---|---|
| Ref. | Bimolecular Gaseous Reaction | Kcal/mole | l/mole sec | $k_{2fe}$ at 300° K l/mole sec | eu at 300° K | Kcal/mole | $k_{2fe}\phi_{AB}$ l/mole sec | KWH/mole |
| 25 | $NH_3 + NH_3 \rightarrow N_2H_4 + H_2$ | 49.1 | $4.2\times10^7$ | $7.2\times10^{-29}$ | 34.0 | 46.4 | $2.1\times10^0$ | $2\times10^8$ |

(a) $\Delta S_p^{\ddagger} = RT\ln\left[\dfrac{Ah}{kT^2e^2R}\right] = -68.881 + 4.575 \log(A)$ (b) $\Delta H^{\ddagger} = E_{act} - 2RT$ (c) $\phi_{AB} = 1 + \dfrac{1}{S}\dfrac{g_{oe}}{g_{2e}}\left(e^{\frac{E_{act}}{RT}} - e\right) \sim 1.0 \times 10^{-8} e^{\frac{E_{act}}{RT}}$ (d) $E_x$ obtained from FIG. 9.

Analogous to equation (6) we write $$\frac{d[B_t]_n}{dt} = e \sum_{ij} k_{ij}[A_i]$$

and analogous to (8)

$$k_{ij} = \kappa_{ij}\frac{kT}{h}\frac{F_{jB}^{\ddagger}}{F_{iA}}e^{-\left(\frac{\epsilon_o + \epsilon_{Bj}^{\ddagger} - \epsilon_{iA}}{kT}\right)}$$

or analogous to (8a), $$k_{ij} = \frac{\kappa_{ij}kT}{h}\frac{F_{jB}^{\ddagger}}{F_{iA}}e^{-\epsilon_{iB}'}\text{MIN}\left[e^{-\left(\frac{\epsilon_{of} - \epsilon_{iA}}{kT}\right)}, 1\right]$$

The same equations can be used for steady state approximation of $[A_{in}]$ in the above equation as for equation (9g) provided the reaction $$A_i + B_T \xrightarrow{k_{2A_iB}} C + D \text{ is}$$

is replaced by

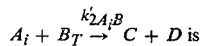
$$A_i \xrightarrow{k_{1Ai}} B$$

where $$k_{1Ai} = \frac{\kappa' k_{1fe} e^{\frac{\epsilon_{of}}{kT}} F_A}{\kappa g_{iA}}$$

and the reaction

$$A_t + B_t \xrightarrow{k_{2fe}} C_t$$

is replaced by

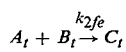
$$A_t \xrightarrow{k_{1fe}} B.$$

If we define $$C_4 = k_{1Ai} + \sum_{\alpha} k_{3A\alpha}[M_\alpha] + k_{4i} \quad (47)$$

then equation (45) can be used to obtain $I_{opt}$. Evaluation of $[A_{in}]$, $\phi_A$ and $E_x$ follow directly: For $m$ level excitation, $$[A_{on}] = [A_{oe}] - \sum_{i=1}^{m}[A_{in}], \text{ where } [A_{in}] = \left[\frac{A_{i-1n}}{3}\right]$$

and recursively $$[A_{in}] = \frac{[A_{on}]}{\xi^i}.$$

Thus $$[A_{on}] = \frac{[A_{oe}]}{1 + \sum_{j=1}^{m}\frac{1}{3^j}}$$

Therefore $$[A_{in}] = \frac{A_{oe}}{3^i\left(1 + \sum_{j=1}^{m}\frac{1}{3^j}\right)} = \frac{g_{oA}[A_t]}{F_A 3^i\left(1 + \sum_{j=1}^{m}\frac{1}{3^j}\right)}$$

Assuming $\kappa_{ij}$ to be a constant $\kappa'$ as before, we obtain, analogous to equation (9)

$$\frac{d[B_t]_n}{dt} = \frac{\kappa'kT}{h}\sum_{ij}^{\infty}\frac{[A_i]}{g_{iA}}g_{jB}^{\ddagger}e^{\frac{-\epsilon_{jB}}{kT}}\text{MIN}[1,\exp(-\frac{\epsilon_{of}-\epsilon_{iA}}{kT})]$$

It follows that

$$\frac{d[B_t]_n}{dt} = K_{1fe}\phi_A[A_t]$$

where $$\phi_A = \frac{\kappa' F_A}{\kappa[A_t]F_C}\sum_{ij}^{\infty}\frac{[A_j]}{g_{iA}}g_{kB}^{\ddagger}e^{\frac{-\epsilon_{KB}}{kT}}[\text{MIN}(e^{\frac{\epsilon_o}{kT}},e^{\frac{\epsilon_{iA}}{kT}})]$$

and $$\kappa' = \frac{\kappa F_C^{\ddagger}}{\sum_{ij}g_{kC}e^{\frac{-\epsilon_{kC}}{kT}}\text{MIN}[e^{\frac{\epsilon_o}{kT}},e^{\frac{\epsilon_{iA}}{kT}}]}$$

$$\simeq \frac{K}{\sigma_A(\epsilon_o)},$$

analogous to equation (9d). It follows, using the same

CONCLUSIONS

The reaction $2NH_3 \rightarrow N_2H_4 + H_2$ was chosen for illustration because it does not take place under thermally equilbrated conditions. High energies of

TABLE IV

Approximate Expected Rate Enhancements and Energy Expenditures for Some Unimolecular Reactions at 300° K and 1 atm., Pumped to or above $\epsilon_0^*$

| Ref | Gaseous Unimolecular Reaction | Eact Kcal/mole | Log₁₀(A) A in sec⁻¹ | ⁴Ife at 300° K sec⁻¹ | ⁴Ife$\phi$A at 300° K sec⁻¹ | Ex KWH/mole |
|---|---|---|---|---|---|---|
| 26. | Cyclo propane → propylene | 65 | 15.17 | $6.6 \times 10^{-33}$ | $6.3 \times 10^5$ | $1.2 \times 10^2$ |
| 27. | Cis isostilbene → trans isostilbene | 42.8 | 12.78 | $4.0 \times 10^{-19}$ | $4.4 \times 10^4$ | $1.5 \times 10^1$ |
| 28. | Trans cyanostyrene → Cis cyanostyrene | 46 | 11.8 | $2.0 \times 10^{-22}$ | $4.1 \times 10^3$ | $1.8 \times 10^1$ |
| 29. | Vinyl allyl ether → alkylacetaldehyde | 30.6 | 11.27 | $1.3 \times 10^{-11}$ | $2.1 \times 10^4$ | $1.8 \times 10^0$ |
| 30. | Cyclobutene → 1,3 butadiene | 32.5 | 13.08 | $2.5 \times 10^{-11}$ | $4.0 \times 10^5$ | $4.7 \times 10^0$ |
| 31. | $CH_3CH_2Cl \rightarrow C_2H_4 + HCl$ | 60.8 | 14.6 | $2.0 \times 10^{-30}$ | $1.9 \times 10^5$ | $1.3 \times 10^2$ |
| 32. | $CH_3CHBrCH_3 \rightarrow CH_3CH = CH_2 + HBr$ | 50.7 | 13.0 | $1.2 \times 10^{-24}$ | $1.9 \times 10^4$ | $4.4 \times 10^1$ |
| 33. | t-Butyl acetate → isobutene + $CH_3COOH$ | 40.5 | 13.34 | $6.9 \times 10^{-17}$ | $5.3 \times 10^5$ | $4.7 \times 10^0$ |
| 34. | $CH_3CH(OOCCH_3)_2 \rightarrow CH_3CHO + (CH_3CO)_2O$ | 32.9 | 10.3 | $2.2 \times 10^{-14}$ | $6.6 \times 10^2$ | $2.0 \times 10^2$ |
| 35. | Perfluoro-cyclobutane → $2C_2F_4$ | 74.1 | 15.95 | $9.4 \times 10^{-39}$ | $1.0 \times 10^6$ | $3.8 \times 10^2$ |
| 36. | $N_2O_4 \rightarrow 2NO_2$ | 13 | 16 | $3.4 \times 10^6$ | $1.3 \times 10^{10}$ | $3.7 \times 10^{-2}$ |
| 37. | $\phi CH_3 \rightarrow \phi CH_2 + H$. | 77.5 | 12.32 | $7.3 \times 10^{-45}$ | $2.3 \times 10^2$ | $4.7 \times 10^2$ |
| 38. | $C_2H_5OOC_2H_5 \rightarrow 2C_2H_5O$. | 34.1 | 13.3 | $2.9 \times 10^{-12}$ | $6.3 \times 10^5$ | $4.7 \times 10^0$ | approximations as before, that $$\phi_A \simeq 1 + \frac{F_A}{[A_t]\sigma_A(\epsilon_o)} \sum_{i=0}^{n_A} \frac{[A_{in}]}{g_{iA}} e^{\frac{\epsilon_{iA}}{kT}} \text{MIN}\left(1, e^{\frac{\epsilon_{of} - \epsilon_{iA}}{kT}}\right)$$

To a good approximation $$\phi_A = 1 + \frac{g_{oA}}{\sigma_A(\epsilon_{of})\left(1 + \sum_{j=1}^{n_A-1} \frac{1}{3^j}\right)} \frac{\text{MIN}(e^{\frac{\epsilon_{of}}{kT}}, e^{\frac{\epsilon_{iA}}{kT}})}{3^i}$$

Finally $E_x$ can be obtained from an equation analogous to equation (37), i.e.

$$E_x = \frac{(^nA - 1)\frac{C_4}{C_3}\epsilon(v_i)}{3.24 \times 10^3 k_{1fe}(\phi_A - 1)}.$$

The limiting minimal expenditure $E_{xlim}$ in KWH/mole, which would result if all excited molecules reacted, is given by $$E_{xlim} = \frac{(^nA - 1)Nhc\bar{v}}{3.6 \times 10^6} = 3.32 \times 10^{-6}(n_A - 1)\bar{v}$$

Figure 11:
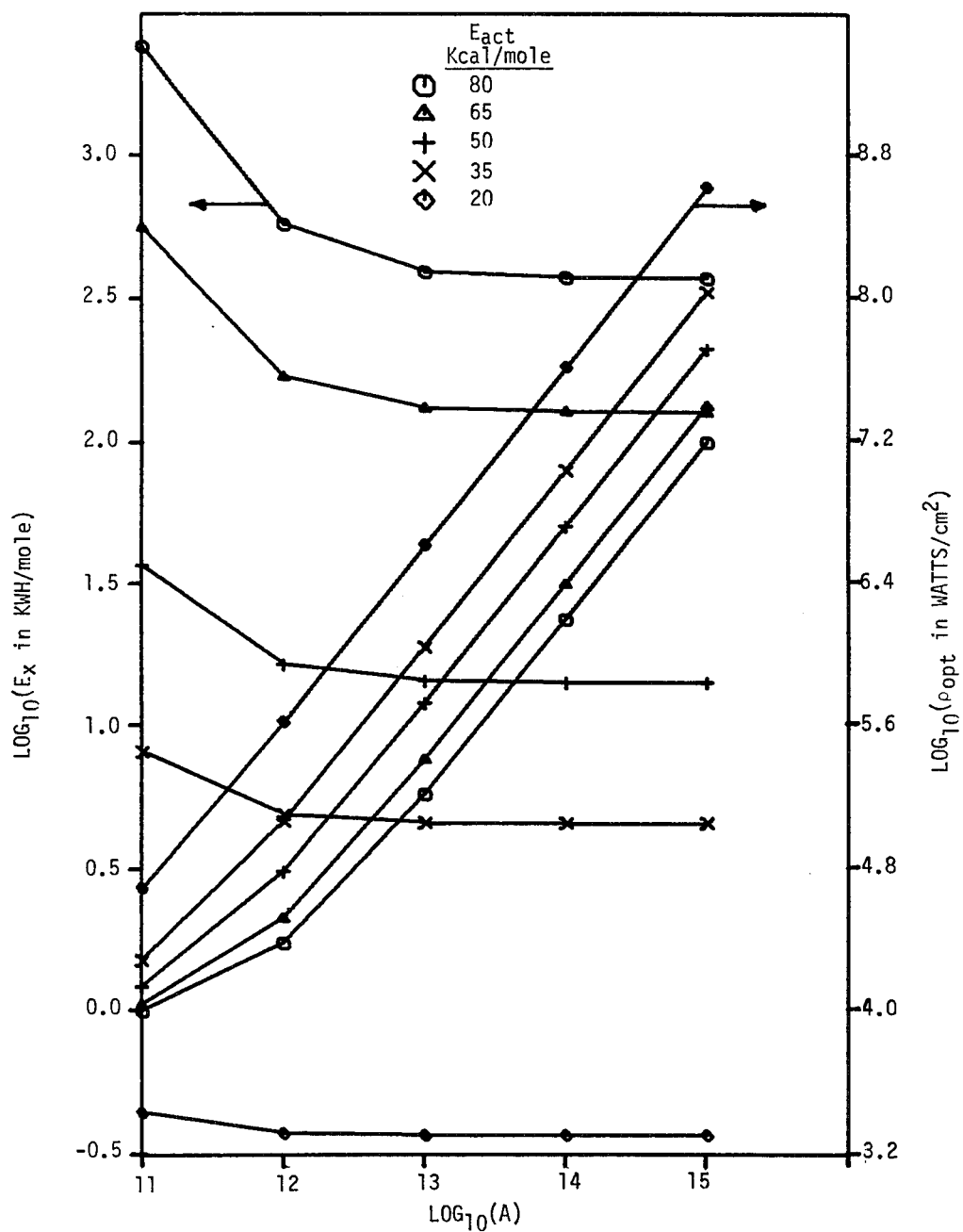
Figure 12:
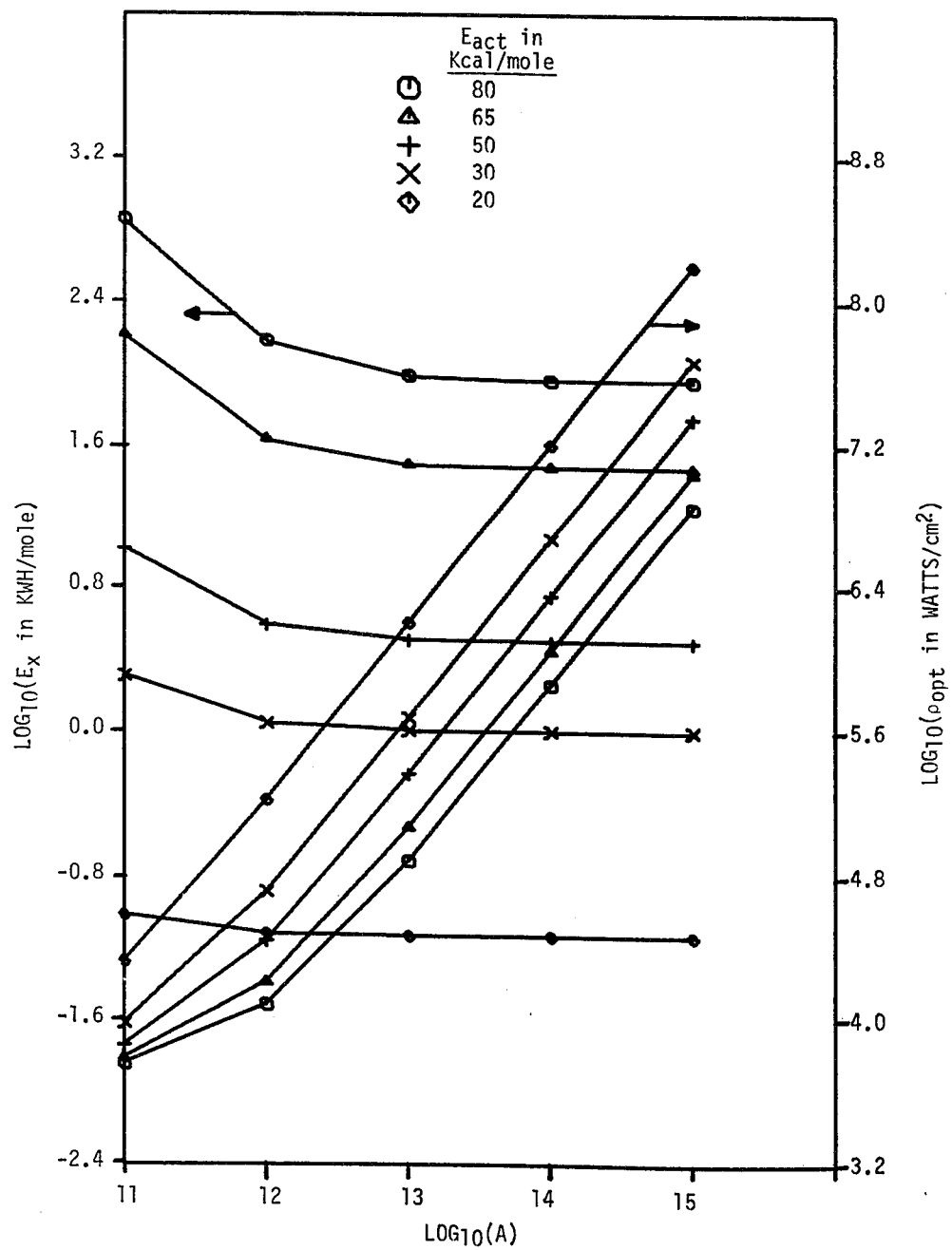
Figure 13:
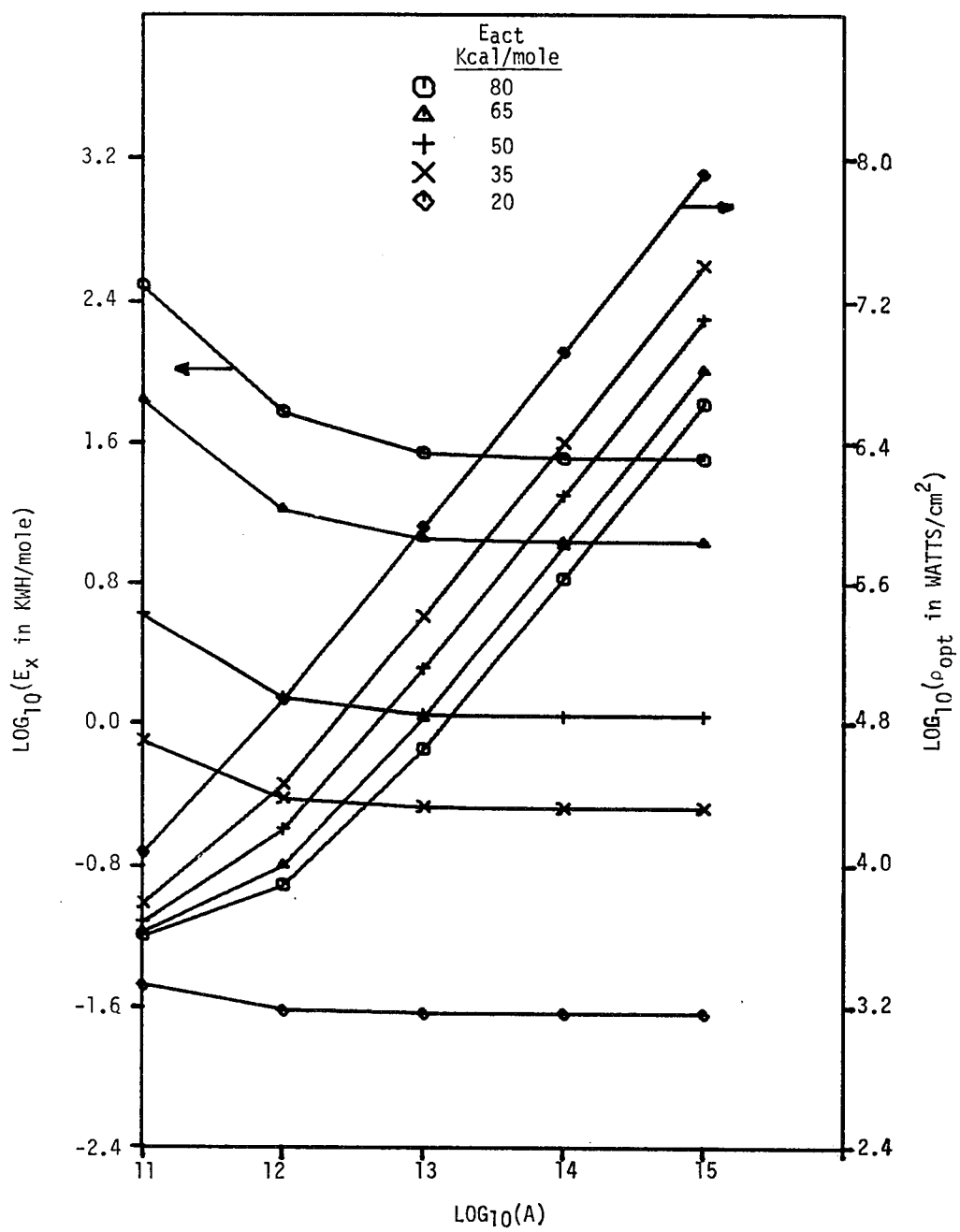

FIGS. 11–13 have been calculated using the above equations for unimolecular reactions and typical molecular parameters for Arrehenius frequency factors between $10^{12}$–$10^{15}$. Even for activation energies of 80 Kcal/mole at room temperature energy expenditures are more favorable than for the most favorable bimolecular reactions. This is because the frequency factors are generally much larger for unimolecular reactions.

Table IV summarizes values for several reactions thought to be unimolecular. It will be noticed that enormous reaction enhancements result for these reactions. Hence unimolecular reactions are expected to predominate in laser induced processes because they will be competitive with thermally favored bimolecular reactions which generally have lower activation energies.

activation and large negative entropies of activation put most bimolecular reactions in the same category. As illustrated, such reactions should be induced with the proper infrared lasers. Several advantages of both process and fundamental inportance immediately come to mind.

Reactions not normally attainable could be induced and their kinetics and thermodynamics studied.

It should be possible to tailor reactions by exciting the proper chemical bonds.

Isotopes could be efficiently separated by this method.

Energy could be stored in chemical compounds having much higher energy content than the reactants from which they were made.

Reaction mechanisms could be elucidated by laser probing.

Fundamental molecular dynamics could be studied.

As illustrated in this paper, laser pumping of vibrational levels should produce chemical reactions not otherwise attainable. Theoretical calculations suggest that this could have far reaching results on the chemical industry. Some of these "unattainable reactions" may take place with molecules which normally undergo other reactions. For example the normal organic reaction

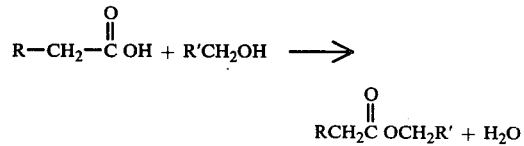

might be replaced by

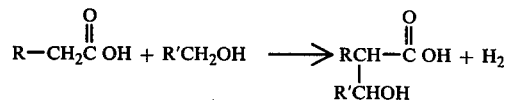

by exciting CH vibrators. This suggests the possibility of tailoring products of given reactants.

If compounds of one isotope can be selectively excited over the corresponding compound of another, then efficient isotopic separation via chemical reaction becomes a possibility.

The storage of Gibb's free energy in chemical compounds formed from compounds of lower Gibb's free energy might be developed into an efficient process. The reaction $2NH_3 \rightarrow N_2H_4$ is not a practical example of this. However other reactions might be.

Reaction rates are frequently controlled by a slow mechanistic step in a chain of steps. Often this step is postulated but not easily proved. Bathing the reaction with laser frequencies common to the suspected reactant of the slow step should, under appropriate conditions, enhance the reaction until the next slowest step is rate controlling. This step may be studied in a like manner.

Reaction rates of laser-catalysed reactions are dependent on a number of competitive energy-transfer processes between degrees of freedom. One can conceive of a number of laser experiments which would provide a detailed understanding of these processes. In particular, the laser activation of one degree of freedom of a molecular beam before collision would provide a probe to elucidate molecular dynamics.

In the absence of a fast-tuning laser, discrete laser frequencies may be used to pump molecules effectively. Two typical schemes are outlined below. To find these schemes requires a precise knowledge of the energies of hot-band transitions. Recently we have reevaluated the spectroscopic parameters for a number of diatomics so that now we can precisely calculate these hot-band transitions, often with uncertainties less than 0.01 cm$^{-1}$. This allows us to search for the schemes which can be used to excite molecules into the 4th and 5th vibrational quantum number levels with our laser system, either by simultaneously using two or more laser frequencies, or by using one judiciously chosen frequency to couple between vibration-rotation levels.

FIG. 15 illustrates a scheme for exciting NO to the 5th vibrational state using one frequency (1814.6 cm$^{-1}$). A CO laser can be made to lase at this frequency. The NO molecule is first pumped to the first vibrational and fifteenth rotational state (1,15) from the zeroeth vibrational and sixteenth rotational state (0,16). By collisional process the ninth rotational state of the first vibrational state is populated. Subsequently, laser pumping takes the molecule to the (2,8) state. The same frequency of the laser with a half band width of 1-2 cm$^{-1}$ can be used to pump from (1,9) to (2,8) as from (0,16) to (1,15). Subsequent transitions occur as indicated in FIG. 15 by sequential excitation and collisional relaxation.

FIG. 16 illustrates a second scheme, which is adaptable to the system illustrated in FIG. 14. In the apparatus 20 of FIG. 14, a Nd doped YAG laser 21 emits light in one of 13 discrete tuned frequencies $\nu$. In a typical example, in accordance with the scheme in FIG. 16, the 0.9464 micron line (10565 cm$^{-1}$) is doubled by the frequency doubler 22. A beam consisting of two lasing frequencies (10565 and 21130 cm$^{-1}$) exits the laser 21. The second of these is modified by passing it through a parametric oscillator 23 held at about 350° C, generating a third infrared beam (2924 cm$^1$). This frequency is responsible for pumping the H$^1$Cl$^{37}$ isotope of an HCl reaction mixture to the first vibrational level and the second rotational level. The fundamental frequency (10565 cm$^{-1}$) is used to pump the molecule on to the 5th vibrational and 3rd rotational level, which are attained despite the low molar absorptivity of the forbidden (1-5) transition. Because of the small volumes which are subjected to this photon flux, a gas chromatographic mass spectrometer typically is used to analyze the reaction mixture. Varying concentrations and photon densities are used to observe changes in rates.

The laser 21 typically comprises a neodymium doped yttria garnet (YAG) rod 21A, an electrooptic Q switch 21B, and a doubling crystal 22 comprising lithium iodate, LiIO$_3$, or other suitable material. The parametric oscillator 23 typically comprises a non-centrosymmetric crystal, such as lithium niobate, LiNbO$_3$, having two indices of refraction which can be varied with temperature, thus varying the frequencies $2\nu-\delta$ and $\delta$ which emit from the parametric oscillator 23. At this point we have four discrete frequencies at any given temperature of the parametric oscillator 23. When other frequencies are desired for the pumping scheme, multiple parametric oscillator or optical dye cavities 23 can be driven by the same laser 21. In the case of n parametric oscillators, the frequencies $\nu$, $2\nu$, $\delta_n$, and $2\nu-\delta_n$ are emitted, where $\delta_n$ represents the n frequencies, one from each parametric oscillator. When $n$ optical dyes are used, the frequencies $\nu$, $2\nu$, and $\delta_n$ are emitted. Those frequencies not wanted to the reaction chamber 24 can be rejected by an appropriate filter 25 and the remaining frequencies can be focused to near the diffraction limit, if need be, within the reaction cell 24 by a long-focal-length lens 26 made of sodium chloride, NaCl, or other appropriate material to transmit the frequencies desired. The focal length of the lens 26 is chosen to be compatible with the power of the laser, the length of the reaction cell 24, and the molar absorptivities of the molecule being excited. For high photon fluxes the lens 26 will have a short focal length, but this must be compatible with the requirement for a sufficiently large confocal parameter to insure passages of laser light through the confines of the reaction cell 24.

The reaction chamber 24 comprises an inlet 27 for reactants and an outlet 28 for products. By using Brewster windows 30 on the cell 24, energy reflection losses can be kept to a minimum. To further improve the utilization of energy, a 100% reflecting mirror 31, typically spherical, and another similar mirror 32, but having a small axial hole 33, cause the radiation admitted through the hole 33 to reflect multiple times through the reaction chamber 24. The reaction products at 28 typically are fed to a gas chromatographic mass spectrometer for analysis, as indicated at 34. The inlet 27 may be arranged to receive not only reactants, as indicated at 35 and 36, but also a gas such as helium, as indicated at 37, for sweeping the reaction chamber 24.

Bimolecular Reactions

The molecule for which intermolecular vibrational relaxation processes are best known is HCl.[8,40,44,45] The rotational constants, fundmanetal vibrational mode, anharmonicities, and dissociation energy are well established. Thus we excite H$^1$Cl$^{37}$ and react it with NO principally because NO is a free radical scavenger. Reactions involved are

HCl + NO → NOCl + H

H + NO → HNO

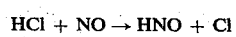

HCl + NO → HNO + Cl

Cl + NO → NOCl

HNO + HNO → HNO dimer

HNO is only stable in the dimeric form. NO is furnished in large excess to keep the reaction simple.

We are now convinced that upward cascading of vibrational levels by collisional processes such as $$HCl(n) + HCl(m) \rightarrow HCl(m+p) + HCl(n-p),$$

where (n) represents the nth vibrational level, are much more important than originally thought. [41] Conceivably, they could lead to unimolecular photo-dissociation reactions, i.e., $$HCl \rightarrow H\cdot + Cl\cdot$$

$$H\cdot + HCl \rightarrow H_2 + Cl\cdot$$

$$H\cdot + Cl-H \rightarrow HCl + H\cdot$$

$$Cl\cdot + HCl \rightarrow HCl + Cl\cdot$$

$$Cl\cdot + HCl \rightarrow H\cdot + Cl_2$$

However, Bauer's work [9] etc., would indicate the preference of four center transition states. To discern these effects, reactions may be studied in mixtures of HCl with DCl. Where the bimolecular reaction is predominant, and HCl is preferentially excited, $H_2$ is the primary product; otherwise, HD also forms in about equal quantities. It has been verified that coupling with HCl can be accomplished without appreciably coupling to DCl. Furthermore, anharmonicity is not so severe as to prohibit pumping successive levels with the same tuned laser.

Other simple reactions with HCl can also be studied. An example is the rate of substitution of hydrogen in homogeneous gas phase reactions $$D_2 + HCl \rightarrow HD + DCl$$

Kinetic data are available for these reactions from single-pulse shock tube measurements. [45]

Unimolecular Reactions

Unimolecular reactions which haave been measured under thermal equilibrium conditions involve more complicated molecules than are conviently used for bimolecular reactions. Simple unimolecular reactions amenable to study are

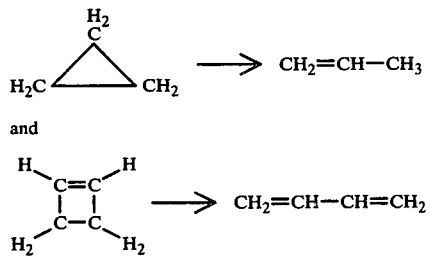

The cyclopropane reaction is probably not as ideal for study as is the cyclobutene reaction because its activation energy is about twice that of cyclobutene. Although the cyclobutene molecule is more complex than cyclopropane, it is not appreciably so, having only three more degrees of freedom (24 vs. 21).

A number of fundamental laser experiments can be performed with the cyclobutene molecule. Whether energy deposited in one degree of freedom will affect the isomerization rate more than if it were deposited in another degree has not been experimentally verified. This is a fundamental question relating to unimolecular reaction rate theory and has been the object of much discussion in the past. It is also very important in determining optimal ways to vary reaction products by changing the exciting frequency of the laser.

Since for the butene reaction one hydrogen must transfer from one carbon to an adjacent carbon, one might expect a priori that excitation of the C—H wagging frequency would be more effective than excitation of the C—H stretching frequency in inducing reaction. Measurement of this effect is in order.

Independent measurements of lifetimes of vibrational levels ($n > 1$) for this molecule will help to answer fundamental questions pertaining to intramolecular relaxation processes and the tailoring of reactions by tuning to different frequencies.

To recapitulate, referring to FIG. 14, in a typical method according to this invention a laser 21A, 21B and a frequency doubler 22 emit radiant energy at frequencies of $v$ and $2v$ into an optical dye within an optical cavity 23 capable of being tuned to a wanted frequency $\delta$, or a parametric oscillator 23 comprising a non-centrosymmetric crystal having two indices of refraction, to emit radiant energy at the frequencies of $v$, $2v$, and $\delta$ (and, with a parametric oscillator, also at $2v-\delta$). These frequencies are adjusted to desired values by selection of the lasing materials, by tuning of the optical cavities, and by controlling the temperature of the parametric oscillator 23. Typically each unwanted frequency is filtered out by the filter 25, and each desired frequency is focused by the lens 26 to the desired radiation flux within a reaction chamber 24 and is reflected repeatedly through the chamber 24 while reactants are fed into the chamber at 27 and reaction products are removed therefrom at 28.

In a typical method for enhancing the reaction of HCl with NO to yield the HNO dimer, a neodymium doped yttria garnet laser 21 provides radiant energy at a frequency of about 10565 cm$^{-1}$, the radiation frequency is doubled at 22 to about 21130 cm$^{-1}$, the doubled frequency radiant energy is passed through a crystal of lithium niobate 23 at a temperature of about 350° C and oriented to emit radiant energy at frequencies of about 2924 cm$^{-1}$ and 18206 cm$^{-1}$, and the radiant energy at about 10565 cm$^{-1}$ and 2924 cm$^{-1}$ is directed through the filter 25 and the lens 26 to the reactants in the chamber 24, in accordance with the HCl$^{37}$ pumping scheme illustrated in FIG. 16.

In another typical method NO is excited to the 5th vibrational state by radiant energy at a frequency of about 1814.6 cm$^{-1}$ as illustrated in FIG. 15.

---

REFERENCES

1. Borde, C., A. Henry, L. Henry, Comptes Rendues, 263B, 619 (1966).
2. Meyer, S. W., M. A. Kwok, R. W. F. Gross, and D. J. Spencer, Applied Phys. Letters, 17, 516 (1970).
3. Basov, N. G., et al, Zh.E.T.F. Pis., 14, No. 4, 251-253 (Aug. 20, 1971).
4. Glasstone, S., K. J. Laidler, H. Eyring, "The Theory of Rate Processes," McGraw-Hill (1941).
5. Airey, J. R., I. W. M. Smith, reported at National A.C.S. Meeting, Boston, -continued
REFERENCES Mass., April 12, 1972.
6. Schlog, E. W., S. Schneider, S. F. Fucher, Ann. Rev. Phys. Chem., 22, 465 (1971).
7. Spicer, L. D., B. S. Rabinovitch, Ann. Rev. Phys. Chem., 21, 349 (1970).
8. Moore, C. B., "Fluorescence," Ed. G. G. Guilbault, Marcel Dekker, New York (1967), Chapter 3.
9. Slater, N. B., "Theory of Unimolecular Reactions, Ithaca, N. Y., Cornell Univ. Press, (1959).
10. Bott, J. F., T. A. Jacobs, J. Chem. Phys. 33, 1271 (1960).
11. Moore, C. B., and Y. T. Yardley, J. Chem. Phys. 45, 1066 (1966).
12. Moeller, T., "Inorganic Chemistry," John Wiley & Sons, New York (1952), p. 582.
13. Audrieth, L. F., and P. Mohr, Chem. Eng. News, 26, 3746 (1948).
14. Herzberg, G., "Infrared and Raman Spectra," D. Van Nostrand, New York (1945), 6th Edition.
15. Sullivan. J. H., J. Chem. Phys., 30, 1292 (1959). N. F. H. Bright and R. P. Haggerty, Trans. Far. Soc., 43, 697 (1947).
16. Kasell, L., "Kinetics of Homogeneous Gas Reactions," Reinhold Publishing Co., New York (1932).
17. Welinsky, I., and H. A. Taylor, J. Chem. Phys., 6, 466 (1938).
18. Benson, S., "The Foundations of Chemical Kinetics," McGraw-Hill Book Co., (1960), p. 291.
19. Lewis, B., and G. Von Elbe, "Combustion, Flames and Explosions," Acedemic Press, Inc., New York, (1951), p. 59.
20. Burns, W. G., and F. S. Dainton, Trans. Faraday, Soc., 48, 39 (1952).
21. Anderson, H. G., G. B. Kistiakowsky and E. R. van Artsdalen, J. Chem. Phys., 10, 305 (1942); 12, 469 (1944).
22. Lacher, J. R., G. W. Tomplin, and J. D. Park, J. Am. Chem. Soc., 74, 1693 (1952).
23. Kistiakowsky, G. B., and W. W. Ransom, J. Chem. Phys., 7, 725 (1939).
24. Frost, A., and R. G. Pearson, "Kinetics and Mechamism," John Wiley & Sons, New York (1953), p. 101.
25. This study, no experiment reported.
26. Chambers T. S., and G. B. Kistiakowsky, J. Am. Chem. Soc., 56, 399 (1934); E. S. Corner and R. N Pease, ibid, 67, 2067 (1945).
27. Smith, D. F., J. Am. Chem. Soc., 49, 43 (1927); J. E. Hawkins and J. W. Vogh, J. Phys. Chem. 57, 902 (1955).
28. Kistiakowsky, G. B., and W. R. Smith, J. Am. Chem. Soc., 58, 2428 (1936).
29. Schuler, F. W., and G. W. Murphy, J. Am. Chem. Soc., 72, 3155 (1950).
30. Cooper, W., and W. D. Walters, J. Am. Chem. Soc., 80, 4220 (1958).
31. Barton, D. H. R., and K. E. Howlett, J. Chem. Soc., 155, 165 (1949).
32. Blades, A. T., and G. W. Murphy, J. Am.Chem. Soc., 74, 6219 (1952).
33. Rudy, C. E., Jr., and P. Fugassi, J. Phys. and Colloid Chem., 52, 357 (1948).
34. Coffin, C. C., Can. J. Research, 5, 636 (1931).
35. Atkinson, B., and A. B. Trenwith, J. Chem. Phys., 20, 754 (1952).
36. Carrington, T., and N. Davidson, J. Chem. Phys., 19, 1313 (1951).
37. Szwarc, M., Nature, 160, 403 (1947), J. Chem. Phys., 16, 128 (1948).
38. Harris, E. J., Proc. Ray. Soc. (London), A173, 126 (1939); R. E. Rebbert and K. J. Laidler, J. Chem. Phys., 20, 574 (1952).
C. B. Moore, "Fluorescence," Chapter 3 G. G. Guibault, Editor, Marcel Dekker, Inc., New York 1967
39. F. DeMartini, J. Ducuing, Phys. Rev. Letters, 17, 117 (1966)
40. Hao-Lin Chen, J. Chem Phys., 55, 5551 (1971)
41. T. J. Odiorne, P. R. Brooks, J. V. V. Kasper, Rice University (1972)
C. Borde, A. Henry, L. Henry, Comptes Rendues, 263B, 619 (1966)
S. W. Mayer, M. A. Kwok, R. W. F. Gross, D. J. Spencer, Applied Phys. Letters, 17, 516 (1970)
42. N. G. Basov, E. P. Markin, A. N. Oraevskii, A. V. Pankratov, A. N. Skachkov, Doklady Akademii Nak SSSR, 1043 (June 11, 1971)
43. See for example: S. H. Bauer, E. Ossa, J. Chem. Phys., 45, 434 (1966); D. Rapp, P. Englander-Golden, J. Chem. Phys., 40, 573 (1964); W. H. Wong, R. A. Marcus, J. Chem. Phys., 55, 5663 (1971); J. H. Parker, G. C. Pimentel, J. Chem. Phys, 48, (1968); J. Chem. Phys., 51, 91 (1969); J. D. Rynbrandt, B. S. Rabinovitch, J. Phys, Chem., 15, 2169 (1971); J. R. Airey, J. W. Smith, J. Chem. Phys. (to be published; J. R. Airey, J. Chem. Phys. 52, 156 (1970); J. H. Kiefer, R. W. Lulz, J. Chem. Phys., 44, 668 (1965); R. D. Leveine and R. B. Bernstein, J. Chem. Phys., 56, 2281 (1972); P. B. Sackett, J. T. Yardley, Chem. Phys. Letters, 6, 323 (1970); C. B. Moore, Annual Rev. Phys. Chem. 23, 387 (1972).
T. D. Padrick, G. C. Pimentel, J. Chem. Phys. 54, 720 (1971); L. D. Spicer, B. S. Rabinovitch, Annual Rev. Phys. Chem., 21, 349 (1970)
44. S. H. Bauer, Private Communication
45. S. H. Bauer, E. L. Resler, Jr., Science, 146, 1045 (1964)

I claim:
1. A method of enhancing a selected chemical reaction that comprises increasing the population of a selected high vibrational energy state of a reactant molecule substantially above its population at thermal equilibrium by directing onto the molecule a beam of radiant energy from a laser having a combination of frequency and intensity selected to pump the selected energy state, and carrying out the reaction with the temperature, pressure, and concentrations of reactants maintained at a combination of values selected to optimize the reaction in preference to thermal degradation by transforming the absorbed energy into translational motion, wherein photons are excited from one energy level to a level above the next higher energy level by providing radiant energy having a plurality of selected frequencies from a laser that is tuned rapidly from one selected frequency to another.

2. A method as in claim 1, wherein the laser is tuned rapidly from higher to lower frequencies corresponding to the vibrational energy levels of the molecule being excited, to successively populate higher vibrational levels of the molecule.

3. A method as in claim 2, wherein the laser is tuned at a rate comparable to those of the dynamic processes within the molecule leading to depopulation.

4. A method for enhancing the reaction of HCl with NO to yield the HNO dimer that comprises increasing the population of a selected high vibrational energy state of a reactant molecule substantially above its population at thermal equilibrium by directing onto the molecule a beam of radiant energy having a combination of frequency and intensity selected to pump the selected energy state, and carrying out the reaction with the temperature, pressure, and concentrations of reactants maintained at a combination of values selected to optimize the reaction in preference to thermal degradation by transforming the absorbed energy into translational motion, wherein a neodymium doped yttria garnet laser provides the radiant energy at a frequency of about 10565 $cm^{-1}$, the radiation frequency is doubled to about 21130 $cm^{-1}$, the doubled frequency radiant energy is passed through a crystal of lithium niobate at a temperature of about 350° C and oriented to emit radiant energy at frequencies of about 2924 $cm^{-1}$ and 18206 $cm^{-1}$, and the radiant energy at about 10565 $cm^{-1}$ and 2924 $cm^{-1}$ is directed to the reactants.

* * * * *